United States Patent
Noh et al.

(10) Patent No.: US 10,425,204 B2
(45) Date of Patent: Sep. 24, 2019

(54) METHOD AND APPARATUS FOR MEASURING CHANNEL STATE INFORMATION IN COMMUNICATION SYSTEM

(71) Applicant: Samsung Electronics Co., Ltd., Suwon-si, Gyeonggi-do (KR)

(72) Inventors: Hoon-Dong Noh, Suwon-si (KR); Dong-Han Kim, Osan-si (KR); Young-Bum Kim, Seoul (KR); Young-Woo Kwak, Suwon-si (KR); Cheol-Kyu Shin, Suwon-si (KR); Youn-Sun Kim, Seongnam-si (KR); Jin-Young Oh, Seoul (KR); Seung-Hoon Choi, Seongnam-si (KR); Sang-Min Ro, Seoul (KR); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 15/069,210

(22) Filed: Mar. 14, 2016

(65) Prior Publication Data

US 2016/0269160 A1    Sep. 15, 2016

Related U.S. Application Data

(60) Provisional application No. 62/132,758, filed on Mar. 13, 2015, provisional application No. 62/245,538, filed on Oct. 23, 2015.

(51) Int. Cl.
*H04L 5/00* (2006.01)
*H04B 7/0417* (2017.01)
(Continued)

(52) U.S. Cl.
CPC ......... *H04L 5/0048* (2013.01); *H04B 7/0417* (2013.01); *H04B 7/0456* (2013.01);
(Continued)

(58) Field of Classification Search
CPC ... H04L 1/0026; H04L 1/0027; H04L 5/0053; H04W 24/08; H04W 24/10; H04W 72/04
See application file for complete search history.

(56) References Cited

U.S. PATENT DOCUMENTS 9,219,571 B2 * 12/2015 Barbieri ................ H04L 1/0026
2011/0249584 A1 * 10/2011 Barbieri ................ H04L 1/0026
                                                          370/252
(Continued)

OTHER PUBLICATIONS

Intel Corporation; Discussion on aperiodic CSI reporting with RI-reference CSI process and Rel-12 CSI subframe sets; 3GPP TSG RAN WG1 Meeting #79; R1-144646; Nov. 17-21, 2014; San Francisco, CA.

(Continued)

*Primary Examiner* — Kevin C. Harper
(74) *Attorney, Agent, or Firm* — Jefferson IP Law, LLP

(57) ABSTRACT

A method for reporting channel state information by a terminal in a multiple access based communication system is provided. The method includes determining a most favored direction with a highest signal quality with respect to a reference signal received from a base station and determining, as a reported object, some channel directions including the most favored direction among channel directions formed together with the base station, identifying a channel quality information group including channel quality information corresponding to the some channel directions among channel quality information groups classified according to a distance measured with respect to the most favored direction, and transmitting the identified channel quality information group to the base station.

16 Claims, 21 Drawing Sheets

(51) Int. Cl.
  *H04B 7/0456* (2017.01)
  *H04B 7/06* (2006.01)
(52) U.S. Cl.
  CPC ......... *H04B 7/0632* (2013.01); *H04L 5/0082* (2013.01); *H04L 5/0094* (2013.01); *H04L 5/0023* (2013.01); *H04L 5/0064* (2013.01)

(56) References Cited

U.S. PATENT DOCUMENTS

| | | |
|---|---|---|
| 2012/0201154 A1 | 8/2012 | Chandrasekhar et al. |
| 2013/0308572 A1 | 11/2013 | Sayana et al. |
| 2015/0245323 A1* | 8/2015 | You .................... H04W 72/042 370/329 |
| 2016/0182208 A1* | 6/2016 | Yi ........................ H04L 1/0026 370/329 |
| 2016/0285535 A1* | 9/2016 | Kim ...................... H04L 5/0016 |
| 2016/0353440 A1* | 12/2016 | Lee ........................ H04W 4/70 |
| 2017/0013615 A1* | 1/2017 | Suzuki ................ H04W 72/042 |

OTHER PUBLICATIONS

LG Electronics; Considerations on CSI reporting for low complexity UE; 3GPP TSG RAN WG1 Meeting #80; R1-150204; Feb. 9-13, 2015; Athens, Greece.
Samsung; CSI Transmission for Enhanced CA; 3GPP TSG RAN WG1 #80; R1-150361; Feb. 9-13, 2015; Athens, Greece.

\* cited by examiner

METHOD AND APPARATUS FOR MEASURING CHANNEL STATE INFORMATION IN COMMUNICATION SYSTEM

CROSS-REFERENCE TO RELATED APPLICATION(S)

This application claims the benefit under 35 U.S.C. § 119(a) of a U.S. Provisional application filed on Mar. 13, 2015 in the U.S. Patent and Trademark Office and assigned Ser. No. 62/132,758, and of a U.S. Provisional application filed on Oct. 23, 2015 in the U.S. Patent and Trademark Office and assigned Ser. No. 62/245,538, the entire disclosure of each of which is hereby incorporated by reference.

TECHNICAL FIELD

The present disclosure relates to methods and apparatuses for measuring channel state information in communication systems.

BACKGROUND

The long term evolution (LTE)/LTE-advanced (LTE-A) or other existing 3rd or 4th generation mobile communication systems utilize a multiple-input multiple-output (MIMO) technique in which transmission is performed using a plurality of transmission/reception antennas in order to increase system capability and data transmission rate. The MIMO technique makes use of a plurality of transmission/reception antennas to spatially separate and transmit a plurality of information streams. The MIMO technique supported by the LTE/LTE-A release 11 and its predecessors supports spatial multiplexing for the case where there are eight transmission antennas and eight reception antennas and supports up to rank-8.

Full dimension-MIMO (FD-MIMO) systems, which have evolved from the legacy LTE/LTE-A MIMO technology, may use eight or more, e.g., 32 or more transmit antennas. In order to effectively implement an FD-MIMO system, the user equipment (UE) needs to exactly measure the channel status and interference magnitude and transmit channel state information based on the exactly measured channel state and interference magnitude to the base station. The base station then determines, e.g., terminals to which the base station sends transmissions, a speed at which the base station sends data, and a precoding it is to apply using the received channel state information. The information fed back from the terminal in LTE/LTE-A-based communication systems generally comes in three types: rank indicator (RI), precoder matrix indicator (PMI), and channel quality indicator (CQI).

The RI, PMI, and CQI are associated with one another and have certain meanings. Different precoding matrixes as supported in the LTE/LTE-A system are defined per rank as an example. Accordingly, although the PMI value when RI is 1 is the same as the PMI value when RI is 2, the PMI values respectively corresponding to the RIs are interpreted in different manners. Further, even when the UE determines the CQI, it assumes that the rank value and PMI value it notified to the base station have been applied by the base station. As such, schemes of generating feedback information assuming a particular transceiver are collectively referred to as implicit feedback. In the implicit feedback scheme, since CQI is generated to include the PMI reported together from the terminal to the base station and the receiver information on the terminal itself, when other cell interference is stable, intra-layer interference may be correctly reflected. That is, the use of implicit feedback benefits that a single user (SU) with rank 2 or higher may enjoy higher-accuracy CQI. By contrast, when the base station uses other precoder than the reported PMI, the CQI loses accuracy and thus the terminal's reception capability is not guaranteed. This means that implicit feedback restricts the freedom for transmission schemes and is not appropriate for multi-user (MU) CQI generation. For this reason, explicit feedback had been discussed until $3^{rd}$ generation partnership project (3GPP) release 10 was released. In explicit feedback, it is not the case that PMI is generated assuming a particular transceiver, rather it means the dominant eigenvector of the channel. The CQI reported together here may be defined in various meanings. An example is to define the CQI to mean a dominant eigenvalue normalized with interference and noise power. Since explicit feedback generates channel status information without assuming a particular transceiver, it does not limit base station transmission schemes and benefits ease to obtain MU scheduling gain over implicit feedback. However, for the same reason, the CQI in explicit feedback has an inaccurate link adaptation capability as compared with the CQI in implicit feedback generated while interworking with transceiver information. Up to now, LTE/LTE-A MIMO systems primarily support implicit feedback-based SU MIMO for various reasons, such as a limited number of base station antenna ports, inaccurate MU CQI, and feedback costs, and MU MIMO is subject to limited support through rank 1 restriction feedback. By contrast, FD-MIMO system has a significantly higher degree of beamforming freedom over LTE/LTE-A MIMO system designed considering only up to eight one-dimensional array transmit antennas because it has a number of transmit antennas and takes a 2-dimensional antenna array into account. This means FD-MIMO base station may form precise beams for terminals present at different positons, and thus, it is obvious that particularly MU scheduling gain may be anticipated as compared with legacy systems. Meanwhile, as set forth above, use of existing implicit feedback optimized for SU MIMO would give only a limited MU scheduling gain. Thus, a need exists for a feedback scheme that may maximize the MU scheduling gain while supporting legacy terminals.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus in which a terminal measures a reference signal and generates and transmits channel status information for efficient data communication in full dimension-multiple-input multiple-output (FD-MIMO) communication based on long term evolution-advanced (LTE-A) systems.

Another aspect of the present disclosure is to provide a method and apparatus for allowing a base station to configure major parameters for generating/reporting information of a terminal, transmitting the reference signal to the terminal, and receiving channel state information transmitted from the terminal.

Another aspect of the present disclosure is to provide a method and apparatus for allocating channel state information of a terminal needing coverage enhancement and allowing the terminal to measure and transmit channel state information.

Another aspect of the present disclosure is to provide a method for configuring a channel state information (CSI) reference resource appropriate for a terminal needing coverage enhancement when data and control channel transmission occurs during one or more subframes of a transmission time interval (TTI) when the terminal needing coverage enhancement transmits control channel and data channel through downlink and provides a method and procedure for measuring A-CSI report by the terminal according to the same.

In accordance with an aspect of the present disclosure, a method for reporting channel state information by a terminal in a multiple access based communication system is provided. The method includes determining a most favored direction with a highest signal quality with respect to a reference signal received from a base station and determining, as a reported object, some channel directions including the most favored direction among channel directions formed together with the base station, identifying a channel quality information group including channel quality information corresponding to the some channel directions among channel quality information groups classified according to a distance measured with respect to the most favored direction, and transmitting the identified channel quality information group to the base station.

In accordance with another aspect of the present disclosure, a method for receiving channel state information by a base station in a multiple access based communication system is provided. The method includes transmitting a reference signal and receiving a channel quality information group corresponding to some channel directions including a most favored direction with a highest signal quality with respect to the reference signal among channel directions formed together with a terminal, wherein the channel quality information group includes channel quality information corresponding to some channel directions included in an identified channel quality information group among channel quality information groups classified according to a distance measured with respect to the most favored direction.

In accordance with another aspect of the present disclosure, a method for transmitting channel state information by a terminal in a communication system is provided. The method includes receiving a control channel repeatedly transmitted corresponding to a predetermined number of subframes for a terminal using part of a bandwidth allocated by a base station, identifying at least one reference frame for measuring aperiodic channel state information included in system information received from the base station among the subframes based on resource allocation information indicating the reference frame, when receiving a report request of the aperiodic channel state information through the control channel, measuring channel state information using a resource obtained through the at least one reference frame, and transmitting the channel state information to a base station during an uplink transmission period.

In accordance with another aspect of the present disclosure, a method for receiving channel state information by a base station in a communication system is provided. The method includes configuring at least one reference subframe for measuring aperiodic channel state information of a terminal using part of an allocated bandwidth, transmitting control information including a request for the aperiodic channel state information through a control channel for the terminal repeatedly transmitted corresponding to a predetermined number of subframes, and receiving channel state information measured using a resource obtained through the at least one reference subframe from the terminal.

In accordance with another aspect of the present disclosure, a terminal reporting channel state information in a multiple access based communication system is provided. The terminal includes a controller determining a most favored direction with a highest signal quality with respect to a reference signal received from a base station and determining, as a reported object, some channel directions including the most favored direction among channel directions formed together with the base station and identifying a channel quality information group including channel quality information corresponding to the some channel directions among channel quality information groups classified according to a distance measured with respect to the most favored direction and a transceiver transmitting the identified channel quality information group to the base station.

In accordance with another aspect of the present disclosure, a base station receiving channel state information in a multiple access based communication system is provided. The base station includes a transmitter transmitting a reference signal and a receiver receiving a channel quality information group corresponding to some channel directions including a most favored direction with a highest signal quality with respect to the reference signal among channel directions formed together with a terminal, wherein the channel quality information group includes channel quality information corresponding to the identified some channel directions among channel quality information groups classified according to a distance measured with respect to the most favored direction.

In accordance with another aspect of the present disclosure, a terminal transmitting channel state information in a communication system is provided. The terminal includes a receiver receiving a control channel repeatedly transmitted corresponding to a predetermined number of subframes for a terminal using part of a bandwidth allocated by a base station, a controller identifying at least one reference frame for measuring aperiodic channel state information included in system information received from the base station among the subframes based on resource allocation information indicating the reference frame, and when receiving a report request of the aperiodic channel state information through the control channel, measuring channel state information using a resource obtained through the at least one reference frame, and a transmitter transmitting the channel state information to a base station during an uplink transmission period.

In accordance with another aspect of the present disclosure, a base station receiving channel state information in a communication system is provided. The base station includes a controller configuring at least one reference subframe for measuring aperiodic channel state information of a terminal using part of an allocated bandwidth, a transmitter transmitting control information including a request for the aperiodic channel state information through a control channel for the terminal repeatedly transmitted corresponding to a predetermined number of subframes, and a receiver receiving channel state information measured using a resource obtained through the at least one reference subframe from the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
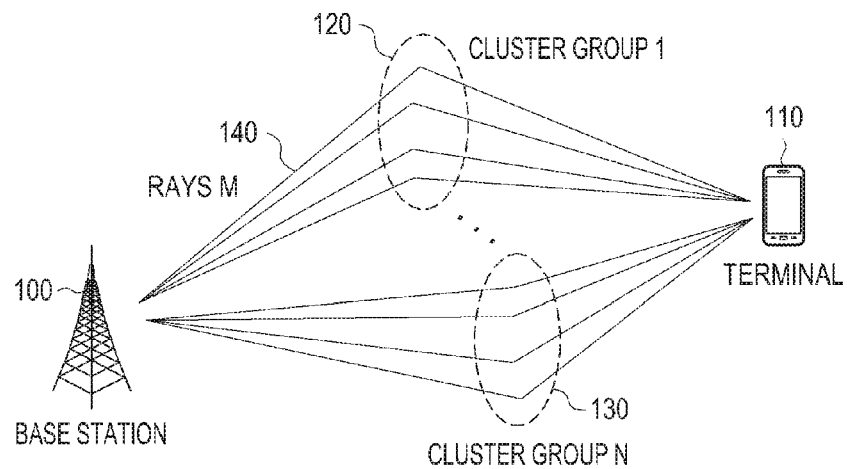
FIG. 1 is a view illustrating an example of a three dimensional (3D) channel model according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before getting into the detailed description of the present disclosure, particular terms or phrases used herein may be defined merely for ease of description. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of" As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, a base station according to an embodiment of the present disclosure may be an entity allocating resource to terminal and may be at least one of eNodeB, node B, base station (BS), wireless access unit, base station controller, or node over network. According to an embodiment of the present disclosure, the terminal may include a user equipment (UE), a mobile station (MS), a cellular phone, a smartphone, a computer, a multimedia system that may perform a communication function, a small sensor including a communication function, a wearable device, or an internet of things device. According to embodiments of the present disclosure, downlink (DL) refers to a wireless transmission path of signal transmitted from a base station to a terminal, and uplink (UL) refers to a wireless transmission path of signal transmitted from a terminal to a base station. Further, although a long-term evolution (LTE) or an LTE-advanced (LTE-A) system is described in connection with embodiments of the present disclosure, as an example, embodiments of the present disclosure may also apply to other communication systems with similar technical background or channel form. Further, embodiments of the present disclosure may be modified in such a range as not to significantly depart from the scope of the present disclosure under the determination by one of ordinary skill in the art and such modifications may be applicable to other communication systems.

First Embodiment

Embodiments of the present disclosure relate to a channel status information communication method for measuring a wireless channel state (channel quality) and notifying a base station of the measurement result by a terminal in a wireless mobile communication system adopting a multiple access scheme using multiple carriers such as orthogonal frequency division multiple access (OFDMA) and communicating the same.

The description of various embodiments of the present disclosure primarily targets orthogonal frequency division multiplexing (OFDM)-based wireless communication systems, particularly $3^{rd}$ generation partnership project evolved universal mobile telecommunications system terrestrial radio access (3GPP EUTRA) standards, but the subject matter of the present disclosure may also be applicable to other communication systems with a similar technical background with minor changes without significantly departing from the scope of the present disclosure.

Figure 2:
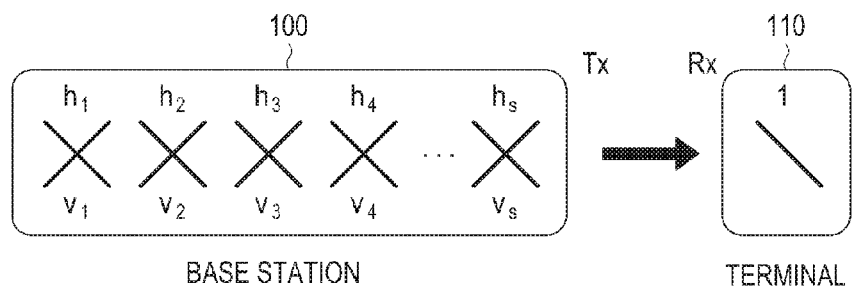
FIG. 2 is a view illustrating an example of a cross polarization (Xpol) antenna array of a base station as illustrated in FIG. 1 according to an embodiment of the present disclosure.

FIG. 1 is a view illustrating an example of a three-dimensional (3D) channel model according to an embodiment of the present disclosure. FIG. 2 is a view illustrating an example of a cross polarization (Xpol) antenna array of a base station as illustrated in FIG. 1 according to an embodiment of the present disclosure.

Referring to FIG. 1, a channel between the base station 100 and the terminal 110 includes several rays 140 spread in vertical and horizontal directions. As a specific example, N rays in similar directions among the rays between the base station 100 and the terminal 110 may be bundled into a single cluster group, thereby configuring a total of N cluster groups (cluster group 1(120), . . . , cluster group N(130)).

From a perspective view of the meaning and limits on the implicit feedback-based rank 1 precoder matrix indicator (PMI) applied to LTE/LTE-A as shown in FIG. 2, it may be possible to design a feedback scheme for efficiently supporting multi-user multiple-input multiple-output (MU MIMO).

For ease of description, as an example, it is assumed that the transmit antennas of the base station 100 as shown in FIG. 1 have 2 S cross polarization (Xpol) antennas arranged in a row, and the terminal 110 has one receive antenna.

Referring to FIG. 2, it is assumed that antenna group 1 of the base station 100 has S antennas $h_1, h_2, \ldots, h_S$ spaced apart from each other at a distance d and arranged at −45 degrees in a positive direction along the X axis. In this case, the channel value formed from each transmit antenna to the receive antenna for the nth cluster among the clusters of the channel formed between the base station 100 and the terminal 110 as measured at a particular time t may be represented as in Equation 1.

$$[h_{h_1,1} \; h_{h_2,1} \; \ldots \; h_{h_S,1}]_n(t) = $$
$$\sqrt{\rho_n} \sum_{m=1}^{M} \exp(j\Phi_{nm}^{(h,h)})\exp(jk\|v\|\cos(\theta_{n,m,AoA} - \theta_v)t) \times$$
$$[1 \; e^{(jkd\sin(\theta_{n,m,AoD}))} \; \ldots \; e^{(jk(S-1)d\sin(\theta_{n,m,AoD}))}]$$

Equation 1

Here, $h_{h_s,1}$ is a channel value from transmit antenna $h_s$ of the base station to receive antenna 1, and $\Phi_{nm}^{(h,h)}$ denotes a change in phase according to antenna polarities. Here, s is the transmit antenna indicator, n the indicator of the path, and m the indicator of the ray. Further, $\theta_{n,m,AoD}$ denotes the angle of departure of the nth path and mth ray, $\rho_n$ denotes the power value of the nth path, k is the wave number defined as the number of radians per unit distance, where $k=2\pi/\lambda$, an $\lambda$ denotes the wavelength. V denotes the mobility vector of the terminal, and $\theta_v$ denotes the mobility angle of the terminal. Refer to [TR 36.873] for definitions of the parameters disclosed in the equations of this disclosure. Antenna group 2 of the base station 100 includes S antennas $v_1, v_2, \ldots, v_S$ arranged at +45 degrees in a positive direction along the X axis, and the channel value formed from each transmit antenna to the receive antenna for the nth path measured at a particular time t for the S antennas may be represented as in Equation 2.

$$[h_{1,v_1} \ h_{1,v_2} \ \ldots \ h_{1,v_S}]_n(t) = \qquad \text{Equation 2}$$

$$\sqrt{P_n} \sum_{m=1}^{M} \sqrt{\gamma_{n1}} \exp(j\Phi_{nm}^{(v,h)}) \exp(jk\|v\|\cos(\theta_{n,m,AoA} - \theta_v)t) \times$$

$$\left[ 1 \ e^{(jkd\sin(\theta_{n,m,AoD}))} \ \ldots \ e^{(jk(S-1)d\sin(\theta_{n,m,AoD}))} \right]$$

In Equation 2, $h_{v_s,1}$ a channel value from transmit antenna $v_s$ to receive antenna 1, and $\Phi_{nm}^{(v,h)}$ denotes a change in phase according to antenna polarities.

From a comparison of Equation 1 and Equation 2, the rank 1 precoding vector maximizing the reception strength of the terminal for the Xpol antenna angled at +45 degrees and the Xpol antenna angled at −45 degrees in the positive direction along the X axis in antenna group 1 and antenna group 2 of the base station 200 of FIG. 2 may be represented as in Equation 3.

$$\begin{bmatrix} [1, \ e^{j[k\sin(\theta_{n,m,AoD})]d}, \ e^{j[k\sin(\theta_{n,m,AoD})]2d}, \ \ldots, \\ e^{j[k\sin(\theta_{n,m,AoD})](S-1)d}], \\ e^{j\phi}[1, \ e^{j[k\sin(\theta_{n,m,AoD})]d}, \ e^{j[k\sin(\theta_{n,m,AoD})]2d}, \ \ldots, \\ e^{j[k\sin(\theta_{n,m,AoD})](S-1)d}] \end{bmatrix}^H \quad \text{Equation 3}$$

Here, $e^{j\phi}$ is for compensating for the phase difference between $\Phi_{nm}^{(h,h)}$ and $\Phi_{nm}^{(v,h)}$ allowing the respective channel values for antenna groups 1 and 2 of two different polarities to have different phases and is a parameter indicating the characteristic that the Xpol antenna of the base station includes two co-polarization (Upol) antennas having different polarities, i.e., the polarization characteristic that they are orthogonal to each other at the same position. Meanwhile, the way LTE/LTE-A Release 10 8Tx rank 1 codebook is designed may be represented as in Equation 4, referring to 3GPP TS 36.213. Hereinafter, a Tx as used herein denotes a transmit antenna.

$$W_{m,n}^{(1)} = \frac{1}{\sqrt{8}} \begin{bmatrix} v_m \\ \varphi_n v_m \end{bmatrix}, \text{ where} \qquad \text{Equation 4}$$

$$\varphi_n = e^{j\pi n/2}$$

$$v_m = [1 \ e^{j2\pi m/32} \ e^{j4\pi m/32} \ e^{j6\pi m/32}]^T$$

Analysis of Equations 3 and 4 shows that the terminal reporting rank 1 PMI in LTE/LTE-A means that the terminal quantizes the most influencing one of various directions $\theta_{n,m,AoD}$ formed with the base station and reports the same to the base station.

As shown in Equation 1 and Equation 2, the actual channel formed between the base station and the terminal includes several direction components. Accordingly, support of MU MIMO based on the legacy rank 1 PMI and channel quality indicator (CQI) may cause problems.

The following description is of a scheme for measuring a channel for two or more terminals according to an embodiment of the present disclosure.

Figure 3A:
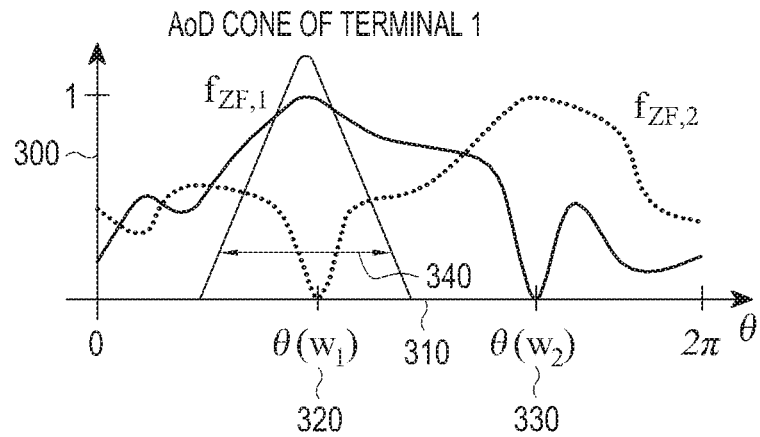
FIGS. 3A to 3C are views illustrating examples of a beam gain for ray direction on a transmitting end when supporting multi-user multiple-input multiple-output (MU MIMO) by applying zero-forcing (ZF) precoding to two terminals according to various embodiments of the present disclosure.
Figure 3B:
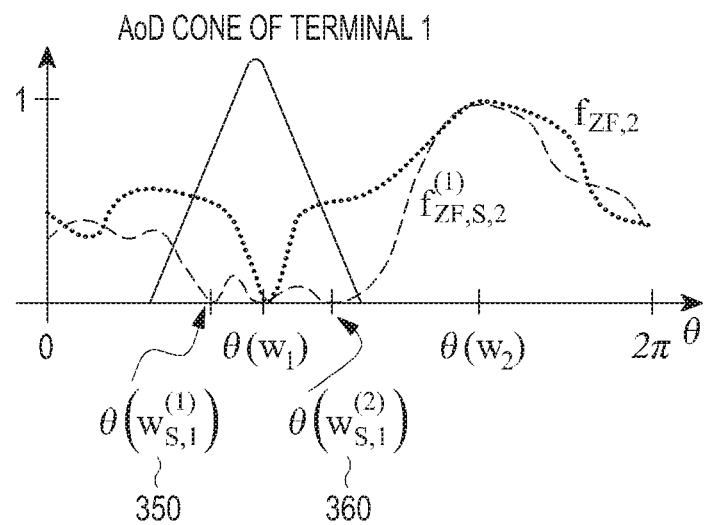
Figure 3C:
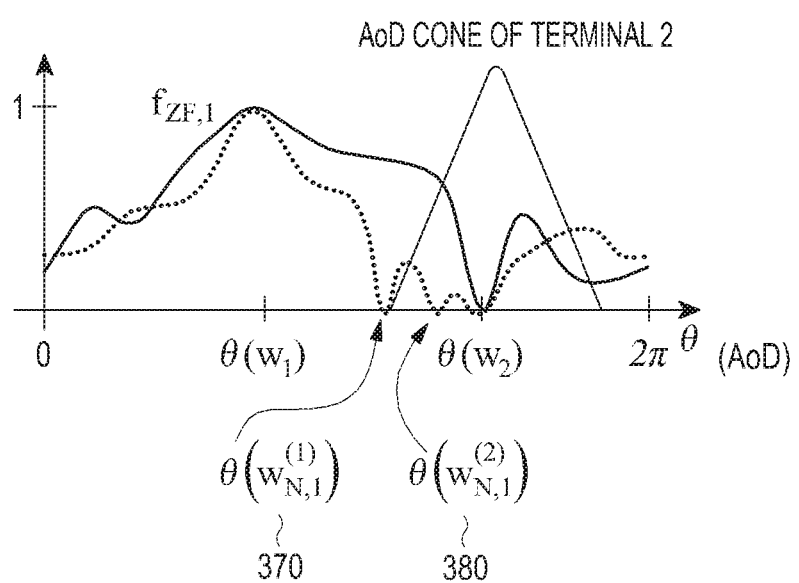

FIGS. 3A to 3C are views illustrating examples of a beam gain for ray direction on a transmitting end when supporting MU MIMO by applying zero-forcing (ZF) precoding to two terminals according to various embodiments of the present disclosure.

FIG. 3A illustrates an example of ray directions with the base station as reported from the terminal to the base station according to an embodiment of the present disclosure.

Referring to FIG. 3A, two terminals correspond to terminal 1 and terminal 2, and the vertical axis 300 denotes the beam gain for the ray direction at the side of the transmit end, and the horizontal axis denotes the ray direction at the side of the transmit end. $\theta(W_1)$ denoted with reference numeral 320 denotes the direction indicated by legacy PMI($W_1$) reported from terminal 1, and $\theta(W_2)$ denoted with reference numeral 330 means the direction indicated by legacy PMI($W_2$) reported from terminal 2.

For ease of description, it is assumed that terminal 1 configures a channel with a transmit end corresponding to the base station 100 of FIG. 2. Reference numeral 340 corresponds to the range including all of the ray directions $\theta_{n,m,AoD}$ included in Equations 1 and 2, and this range is hereinafter referred to as an azimuth of departure (AoD) cone according to an embodiment of the present disclosure. Considering the vertical direction in full dimension MIMO (FD-MIMO) systems, a zenith of departure (ZoD) cone may be defined similarly to the AoD.

Assuming ZF precoding, the precoder of terminal 1 would form a null in direction 330 while maintaining a gain in direction 320, and the precoder of terminal 2 would form a null in direction 320 while maintaining a gain in direction 330. Equations 1 and 2 mean that the channel of terminal 1 may also be present in a direction other than direction 320 reported by terminal 1. Accordingly, when the beam width of the null formed by the precoder of terminal 2 is smaller than AoD cone 340 of terminal 1, terminal 2 may present an unneglectable degree of interference with terminal 1. Meanwhile, since the CQI reported by terminal 1 has been generated without consideration of the inter-layer interference, the reception capability of terminal 1 cannot be guaranteed under such situation. Thus, according to an embodiment of the present disclosure, the terminal may guarantee the terminal's reception capability considering inter-layer interference as set forth above by reporting additional pieces of information regarding the AoD cone in addition to the legacy PMI. FIG. 3B illustrates an example of the additional information on the AoD cone reported from the terminal to the base station according to an embodiment of the present disclosure Referring to FIG. 3B, according to an embodiment of the present disclosure, the additional AoD cone information may be information on other PMI or a PMI group included in an AoD cone in addition to the legacy PMI as in reference numeral 350 or 360. Then, terminal 1 may give the base station a suggestion that although the channel direction favored by terminal 1 is the direction 320, use of direction 350 or 360, which is one of the channel directions formed between terminal 1 and the transmit side, for signal communication with another terminal may cause heavy interference by reporting the PMI corresponding to the direction 350 or 360 to the base station. As another example, FIG. 3C shows the additional AoD cone information reported from the terminal to the base station according to an embodiment of the present disclosure.

Referring to FIG. 3Cc, it may be the information regarding the PMI or a PMI group not included in the AoD cone 340, such as reference numeral 370 or 380. In such case, terminal 1 reports the PMI corresponding to the direction 370 or 380 to the base station. Then, the base station forms a null in direction 370 or 380 as well as direction 330 to reduce the probability that inter-layer interference occurs with terminal 2. Further, according to an embodiment of the present disclosure, the base station may design a transmission/reception filter by reflecting the AoD or ZoD cone information reported from the terminal and perform MU scheduling.

Hereinafter, a specific method for generating and reporting the AoD cone information or additional AoD cone information is described according to an embodiment of the present disclosure. According to an embodiment of the present disclosure, a subspace included in the AoD cone may correspond to the channel direction favored by the terminal as described above, and the additional AoD cone information may be configured to include the channel directions formed by the terminal with the transmit end in addition to the favored channel direction or to include other channel directions than the channel directions formed at the terminal and the transmit end. The signal subspace corresponding to the channel direction formed between the terminal and the base station includes the favored channel direction and other channel directions formed by the terminal together with the transmit end. Such signal subspace is a channel direction influencing the terminal, and when a signal is transmitted from another terminal, it corresponds to the section where interference is highly likely to occur. By comparison, the noise subspace corresponding to the channel direction other than the channel formed between the terminal and the base station corresponds to a channel direction not influencing the terminal, and although a signal is transmitted from another terminal, it corresponds to a section where the signal from the other terminal may be easily removed. Accordingly, according to an embodiment of the present disclosure, when the terminal transmits the AoD cone information or additional AoD cone information, the base station, upon receiving the information, may determine whether the corresponding direction may interfere with the terminal or not.

<Subspace Quantization and Reporting Method 1>

In this embodiment, the terminal may generate AoD or ZoD cone information based on the codebooks according to Release 12 and its precedents and codebooks according to Release 13 and its subsequent releases to be determined in the future.

FIGS. 4A to 4D are views illustrating examples of a subspace quantization method according to various embodiments of the present disclosure.

Figure 4A:
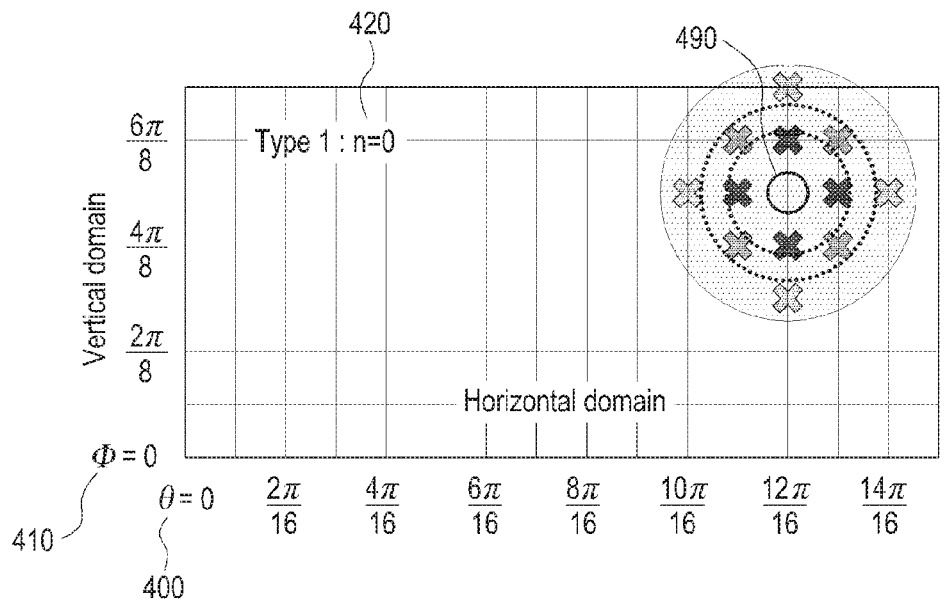
FIGS. 4A to 4D are views illustrating examples of a subspace quantization method according to various embodiments of the present disclosure.

Referring FIG. 4A, as an example, each grid denotes the three-dimensional (3D) channel direction indicated by the PMI 400 corresponding to the horizontal direction θ and the PMI 410 corresponding to the vertical direction φ. In FIG. 4A, for example, the inter-grid interval may be set to π/16 in the horizontal direction θ(400) and may be set to π/8 in the PMI 410 corresponding to the vertical direction φ. The inter-grid interval is a value randomly determined for ease of description, and different values may be applied depending on the codebook that will be actually applied in vertical/horizontal directions or a codebook to be applied in the 3D channel direction. According to an embodiment of the present disclosure, it is assumed that the direction 490 indicated by the legacy PMI indicates 12π/16 in the horizontal direction and 5π/8 in the vertical direction as shown in FIGS. 4A and 4C.

As in the examples shown in FIGS. 4A to 4D, the base station and the terminal may quantize and feedback subspace information (SI) by defining the type and dispersion of the subspace. According to an embodiment of the present disclosure, the type of space may indicate one or both of the shape and size of the AoD or ZoD cone. Here, the term subspace corresponds to a signal subspace of the terminal and corresponds to the area shaded in FIGS. 4A to 4D. As an example, the type of subspace may indicate the shape and wideband size of subspace, and the dispersion may indicate the subband size of subspace. The wideband size may correspond to, e.g., the maximum size of the subspace. The embodiments shown in FIGS. 4A to 4D are examples when representing the subspace information using a predetermined number of bits, e.g., 4 bits, configured to indicate four type information pieces (n∈{0,1,2,3}, 420), four distribution or distance information pieces, respectively. Here, the distance information d may denote the position of a neighbor PMI with respect to, e.g., the distance of the legacy PMI. For example, it is assumed that a right position of the legacy PMI is denoted as 'd=0.' Then, with respect to the position of the legacy PMI, the direction 430 may be denoted as 'd=1,' the direction 440 as 'd=2,' and the direction 450 as 'd=3.'

Figure 4B:
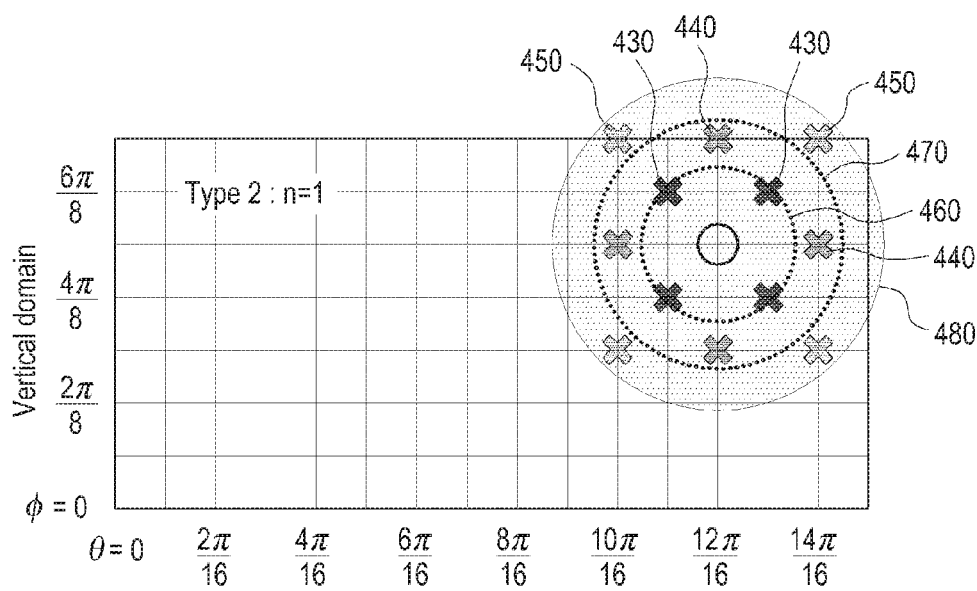
Figure 4C:
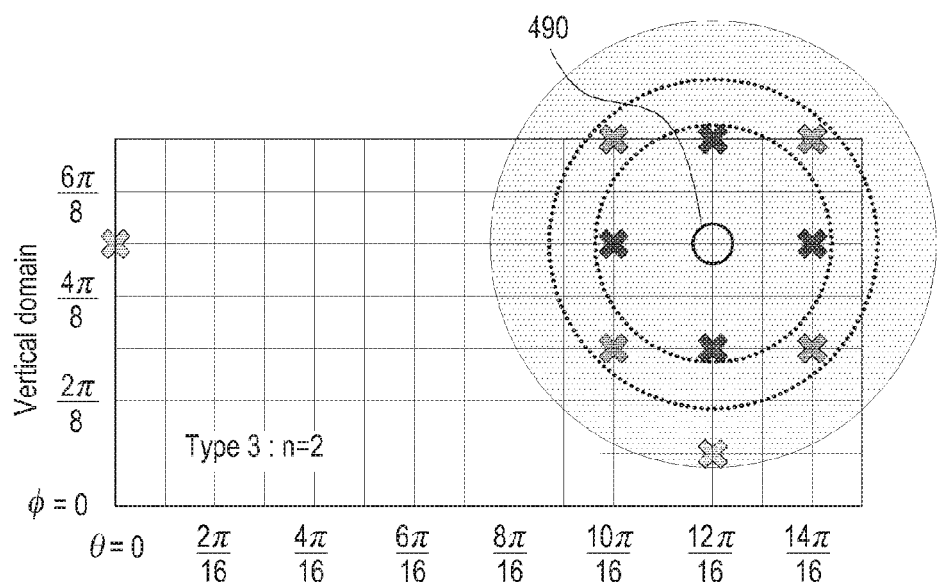
Figure 4D:
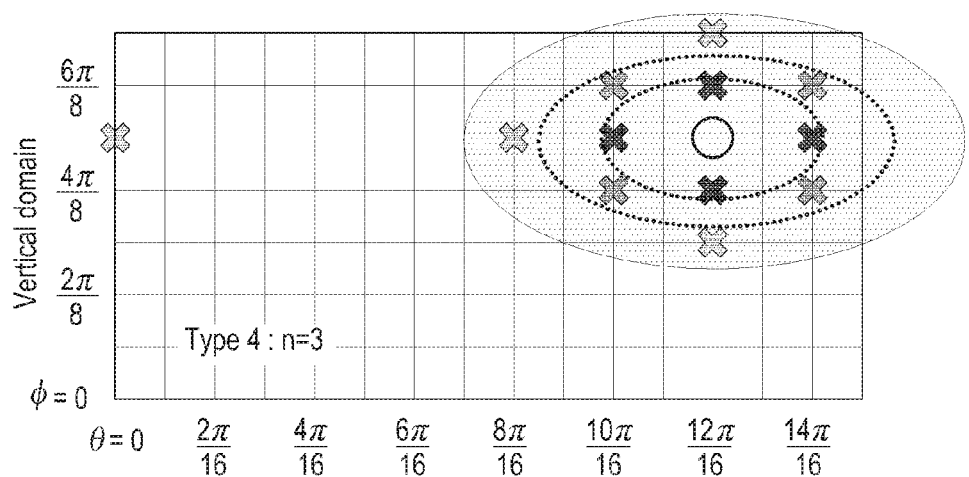

Referring to FIG. 4B, assumed is the case where the terminal reports the bit sequence indicating type 2 and the direction 430 to the base station. In such case, the base station may determine the PMI group included in the subband 460 including the direction 430 as the signal subspace of the terminal. As another example, assumed is the case where the terminal reports the bit sequence indicating type 2 and the direction 440 to the base station. Then, the base station may determine the PMI group included in the subband 470 including the direction 440 as the signal subspace of the terminal Here, the PMI group included in each subband may denote all codebook vectors included between the boundary of each range and legacy PMI 490 or only PMIs belonging to each tier of subbands 460 and 470.

In the above embodiment, as a means to define the type and dispersion of the subspace, (+) operation and (−) operation may be defined. LTE/LTE-A Release 10 8Tx codebook and Release 12 4Tx codebook are configured of discrete Fourier transform (DFT) codebook vectors sequentially arranged. Accordingly, one of the grids configuring each shown in FIGS. 4A to 4D may be designated by a predetermined agreement.

Figure 5:
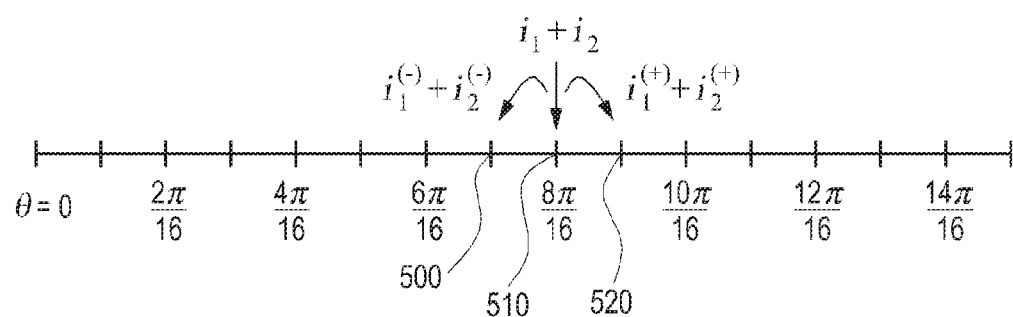
FIG. 5 is a view illustrating an example of (+) operation and (−) operation for defining a type and distribution of a subspace according to an embodiment of the present disclosure.

FIG. 5 is a view illustrating an example of (+) operation and (−) operation for defining the type and distribution of a subspace according to an embodiment of the present disclosure.

Referring to 3GPP TS 36.213, it is assumed that $i_1$ and $i_2$ of FIG. 5, respectively, refer to the first PMI and second PMI of Release 10 8Tx codebook. For ease of description, an example is given which only considers the horizontal direction θ and the Release 10 8Tx codebook. Release 10 8Tx codebook has a dual codebook structure, and thus, $i_1$ and $i_2$ may interwork to indicate one direction 510 of the grids shown in FIG. 5. Here, $i_1^{(+)}$ and $i_2^{(+)}$ may be calculated which indicate the direction 520 one-step shifted to the phase 2π direction from the direction 510 through Equation 5.

$$i_1^{(+)} = i_1 + \lfloor \lfloor i_2/4 \rfloor/4 \rfloor, i_2^{(+)} = (i_2+4)\%16 + 8 \cdot \lfloor \lfloor i_2/4 \rfloor/4 \rfloor \quad \text{Equation 5}$$

$i_1^{(-)}$ and $i_2^{(-)}$ indicating the direction 500 one-step shifted from the direction 510 to the phase 0 direction may be calculated by Equation 6 below.

$$i_1^{(-)}=i_1-(1-\lfloor i_2/4 \rfloor)^+, i_2^{(-)}=(i_2-4)\%16-8\cdot(1-\lfloor i_2/4 \rfloor)^+ \quad \text{Equation 6}$$

Equation 5 indicates (+) operation for obtaining $i_1^{(+)}$ corresponding to the position shifted from the reference phase to the phase $2\pi$ direction. Equation 6 indicates (+) operation for obtaining $i_1^{(-)}$ corresponding to the position shifted from the reference phase to the phase 0 direction. Then, according to an embodiment of the present disclosure, the respective types shown in FIGS. 4A to 4D may be defined using the (+) operation and (−) operation described above. For example, for type 3 in FIG. 4C, i.e., when n=2, the distribution corresponding to the first dotted-line area from the direction 490 indicated by the legacy PMI may be represented through two (+) operations or two (−) operations for both the horizontal direction and vertical direction. As another example, for type 4 in FIG. 4D, the distribution corresponding to the first dotted-lines may be represented through two (+) operations or two (−) operations in the horizontal direction and through one (+) operation or one (−) operation in the vertical direction. The (+) operation and (−) operation according to Equations 5 and 6 are merely examples, and detailed expressions may be varied depending on the codebooks that apply.

According to an embodiment of the present disclosure, the base station may determine whether the PMI reported from the terminal is included in the signal subspace including the channel directions formed between the base station and the terminal or the noise subspace including other directions than the channel directions based on the AoD cone information or additional AoD cone information reported from the terminal. Three options may be performed according to embodiments. Specifically, according to an option 1 embodiment of the present disclosure, the base station may instruct the terminal to generate CQI in the legacy PMI direction assuming that the direction of a particular PMI is a virtual interference direction. The CQI corresponding to the interference PMI corresponding to the interference direction is denoted as CQI under a given interfering PMI (iCQI). The base station may configure a reference CQI ($CQI_{th}$) to be used as a reference for the terminal or modulation and coding scheme (MCS) level and transfer the configured information to the terminal. The terminal may compare estimated iCQI with $CQI_{th}$, and when iCQI is smaller than $CQI_{th}$ as a result of the comparison, it may determine that the interference PMI direction is included in the signal subspace or AoD or ZoD cone. When comparison results show that iCQI is larger than $CQI_{th}$, it may be determined that the interference PMI direction is included in the noise subspace. According to an option 2 embodiment of the present disclosure, similarly to option 1, the base station may instruct the terminal to generate iCQI and configure a differential CQI value or offset level (nCQI) for comparison with the difference between the legacy CQI and iCQI. In this case, the terminal calculates the difference between the legacy CQI and iCQI and compares the calculated difference with nCQI. When the comparison results show that the difference is smaller than nCQI configured by the base station, it may be determined that the interference PMI direction corresponding to iCQI is in the noise subspace. When the difference between legacy CQI and iCQI is larger than the nCQI configured by the base station, it may be determined that the interference PMI direction is in the signal subspace.

According to an option 3 embodiment of the present disclosure, no new CQI is additionally defined, and it is determined that the PMIs corresponding to CQI index 0 (lowest MCS level or link failure) are included in the noise subspace. The terminal may report information corresponding to CQI index 0 to the base station.

Figure 6A:
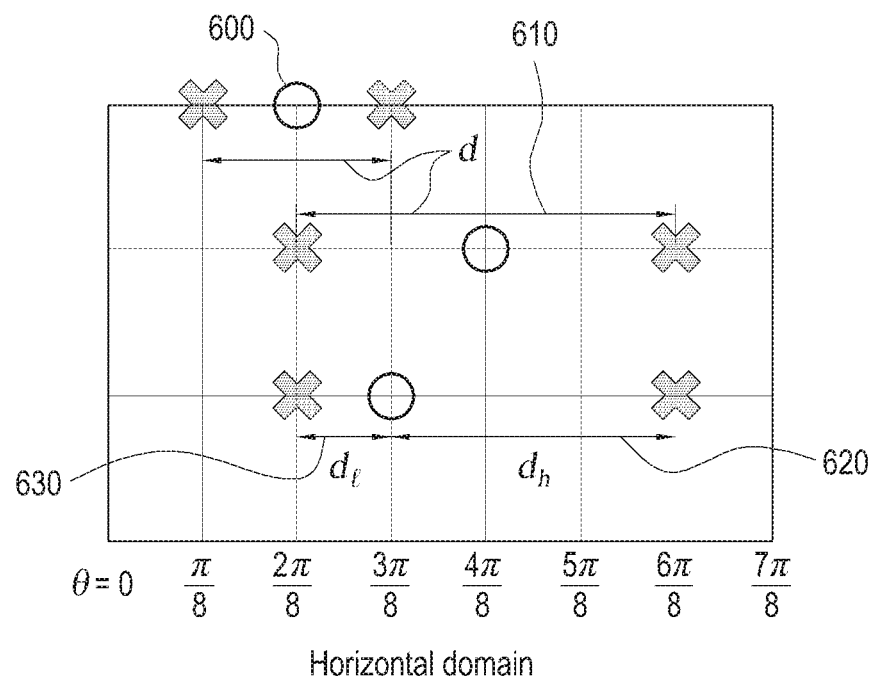
FIGS. 6A and 6B are views illustrating an example of a method for quantizing and reporting a subspace considering each of a horizontal and vertical direction according to various embodiments of the present disclosure.
Figure 6B:
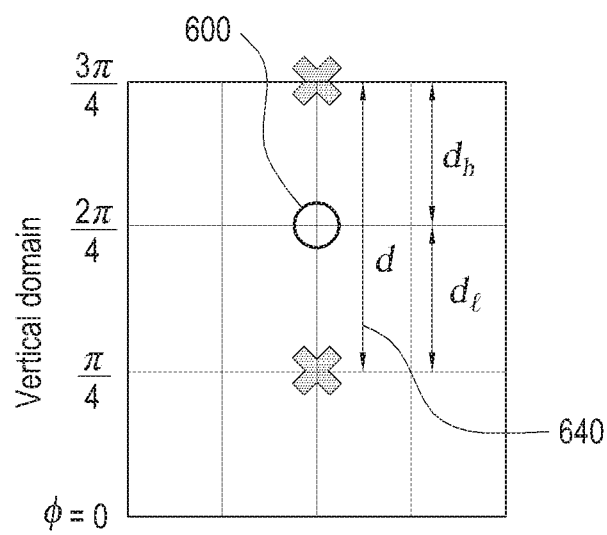

FIGS. 6A and 6B are views illustrating an example of a method for quantizing and reporting a subspace considering each of a horizontal and vertical direction according to various embodiments of the present disclosure.

Although the subspace quantizing and reporting method 1 described above considers both vertical and horizontal directions, it may also be performed separately considering each of the horizontal direction and the vertical direction as shown in FIGS. 6A and 6B. Detailed operations of the method of quantizing and reporting a subspace separately considering the horizontal direction and the vertical direction are not significantly different from the description of subspace quantization and reporting method 1, and no detailed description thereof is given.

Referring to FIG. 6A, the subspace distribution information may be evenly reported in both directions as in reference numeral 610 for the horizontal direction with respect to the legacy PMI 600 (similar to FIG. 10), and different values may be reported for the horizontal direction as in reference numerals 620 and 630.

Referring to FIG. 6B, the subspace distribution information may be evenly reported in both directions as in reference numeral 640 for the vertical direction with respect to the legacy PMI 600, and different values may be reported for the horizontal direction.

<Subspace Quantization and Reporting Method 2>

According to an embodiment of the present disclosure, as an example, a local codebook as represented as in Equation 7 is assumed.

$$S=\{e_1, w_0, \ldots, w_{S-2}\} \text{(local codebook)}$$

$$e_1=\{1, 0, \ldots, 0\}^T \text{ (root (center) vector)}$$

$$w=\{r_1 e^{j\Theta_1}, r_2 e^{j\Theta_2}, \ldots, r_{Nt} e^{j\Theta_{Nt}}\} \text{(local codebook element)} \quad \text{Equation 7}$$

Here, r1 and r2 denote the sizes of the local codebook element represented in phase and size.

Figure 7A:
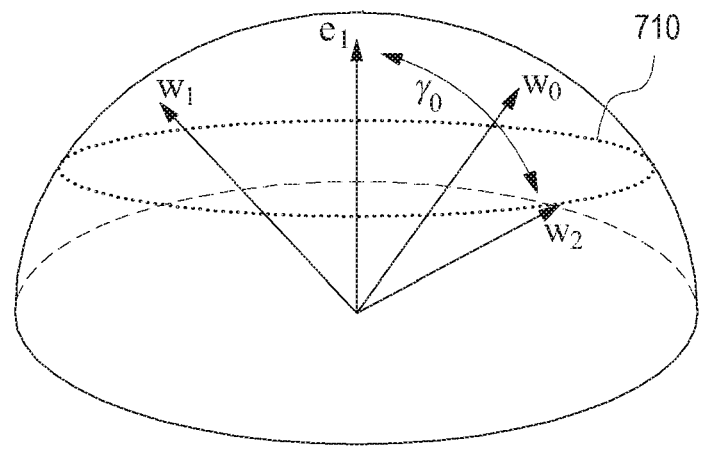
FIGS. 7A and 7B are views illustrating an example of scaling of a local codebook according to various embodiments of the present disclosure.
Figure 7B:
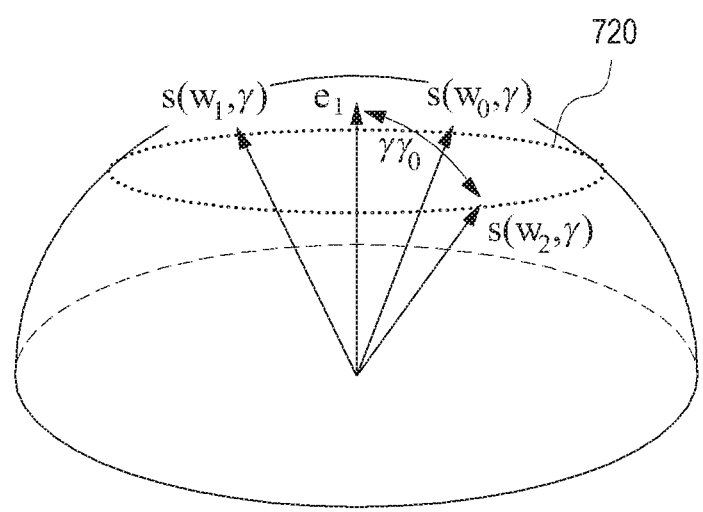

FIGS. 7A and 7B are views illustrating an example of scaling of a local codebook according to various embodiments of the present disclosure.

Referring to FIG. 7A, the maximum radius covered by the local codebook s of Equation 7 is calculated as in Equation 8.

$$\gamma_0 := \max_{s_k \in S, s_k \neq e_1} d(s_k, e_1) \text{ (local codebook coverage)} \quad \text{Equation 8}$$

Here, the reference vector $e_1$, as represented in Equation 7, has a first element of 1 and remaining elements of 0's, and thus, as covered by the local codebook S, the covered maximum radius may be adjusted in the magnification ratio $\gamma$ using Equation 9. The adjusted covered radius is 710. When $\gamma<1$, the maximum radius covered by the local codebook s is reduced as in 720 of FIG. 7B.

In this embodiment, a method of quantizing a subspace and reporting the quantized information to the base station using the codebook scaling scheme is described. In the subspace quantization and reporting method 1, the resolution for subspace information cannot be larger than the largest resolution of the codebook. According to an embodiment of the present disclosure, subspace information quantization based on the codebook scaling enables the base station to obtain more accurate AoD and Zod cone information.

Figure 7C:
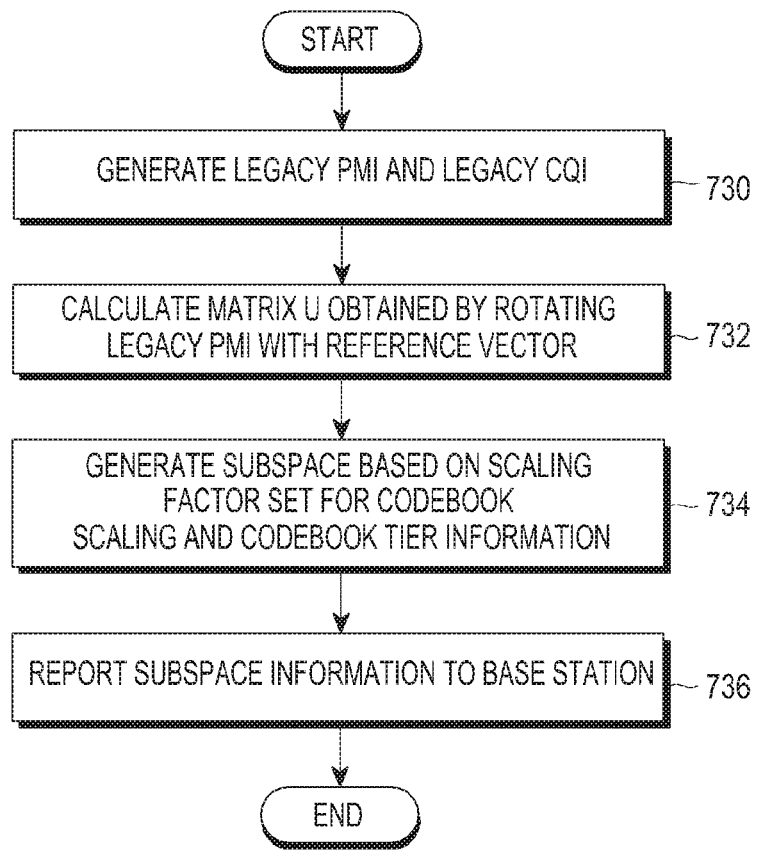
FIG. 7C is a flowchart illustrating an operation of a terminal according to a subspace quantization and reporting method 2 according to an embodiment of the present disclosure.

FIG. 7C is a flowchart illustrating an operation of a terminal according to a subspace quantization and reporting method 2 according to an embodiment of the present disclosure.

Referring to FIG. 7C, in operation 730, the terminal generates legacy PMI and legacy CQI. In operation 732, the terminal calculates matrix U rotating the legacy PMI with respect to the reference vector $e_1$. According to an embodiment of the present disclosure, the base station and the terminal share the calculation method for the matrix U. Accordingly, the terminal may exactly infer how the legacy codebook has been scaled based on the legacy PMI and scaling factor reported from the terminal. An example for u is shown in Equation 9.

$$U^T = I - uu^*/u^*e_1, \text{ where } u = e_1 - w_{PMI} \quad \text{Equation 9}$$

Here, $w_{PMI}$ is a codebook vector indicated by legacy PMI.

The base station may configure one or more scaling factors $\gamma$ for the terminal through L1 signaling or higher layer signaling in order for codebook scaling. According to an embodiment, a set of scaling factor $\gamma$ or $\gamma$ may be able to be previously shared between the base station and the terminal. The scaling factor $\gamma$ means a codebook reduction ratio. According to an embodiment of the present disclosure, multiple scaling factor sets may be configured, and as an example, two sets may be defined as shown in Equation 10. When the scaling factor set is configured, the terminal may report, to the base station, the identification information regarding the set and the index of the scaling factor to be reported among the scaling factors configuring the set.

$$\gamma_{equal} \in \left\{0, \frac{3}{\Gamma}, \frac{2}{\Gamma}, \frac{1}{\Gamma}\right\}, \gamma_{weighted} \in \left\{0, \frac{1}{\Gamma^1}, \frac{1}{\Gamma^2}, \frac{1}{\Gamma^3}\right\} \quad \text{Equation 10}$$

Here, $\Gamma$ is a constant. Additionally, to quantize the subspace information, the base station and the terminal may classify each codebook vector into a few tiers according to an embodiment of the present disclosure. The base station and the terminal may sort the codebook vectors in descending order in the same order with respect to the codebook vector correlation indicated by the legacy PMI. Equation 11 is an example of codebook vector tier as classified by the above method.

$$\underbrace{w_0 \sim w_5}_{\text{Tier 1}}, \underbrace{w_6 \sim w_{13}}_{\text{Tier 2}}, \underbrace{w_{14} \sim w_{37}}_{\text{Tier 3}}, \underbrace{w_{38} \sim}_{\text{Tier 4}} \quad \text{Equation 11}$$

According to an embodiment, the base station and the terminal may use the LTE/LTE-A codebook structure to group codebook vectors with respect to the beam group (BG) $BG_{i1}$ indicated by the first PMI $i_1$. Equation 12 is an example of BG-based codebook vector tier structure.

$$\underbrace{BG_{i1}}_{\text{Tier 1}}, \underbrace{\{BG_{i1-1}, BG_{i1+1}\}}_{\text{Tier 2}}, \underbrace{\{BG_{i1-2}, BG_{i1+2}\}}_{\text{Tier 3}}, \underbrace{\{BG_{i1-3}, BG_{i1+3}\}}_{\text{Tier 4}} \quad \text{Equation 12}$$

The number of codebook tiers and the number of elements configuring each tier as shown in Equations 11 and 12 are not limited to the above example and may be varied depending on circumstances. In operation 734, the terminal may generate subspace information based on the above-described scaling factor set information and codebook tier information, and the terminal may report the generated subspace information to the base station in operation 736. According to an embodiment of the present disclosure, the subspace information may include at least one of, e.g., the tier index including the PMI to be reported, corresponding scaling factor index, or identification information on the scaling factor set including the scaling factor index and the scaling factor.

According to an embodiment of the present disclosure, a method for determining whether the scaled codebook vector is included in the signal subspace or noise subspace is similar to the embodiments of the above described options.

Figure 8:
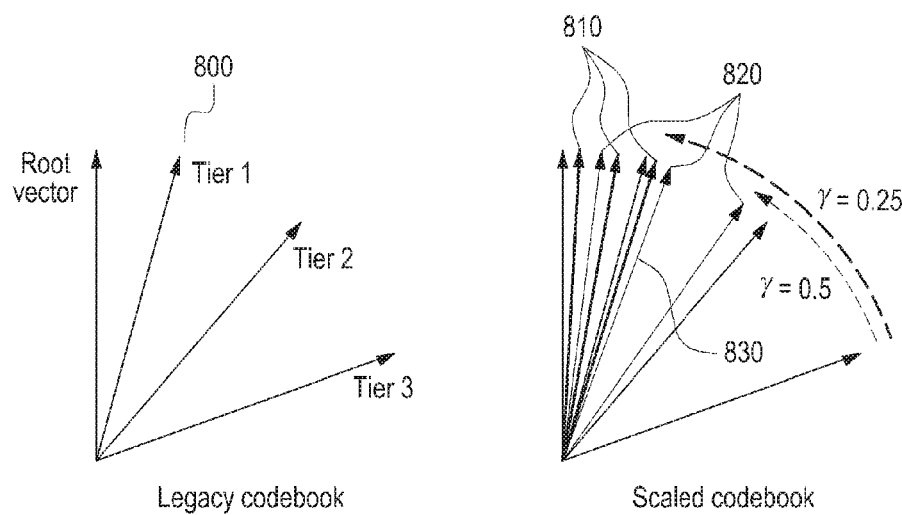
FIG. 8 is a view illustrating an example in which set information of a scaling factor and codebook tier information interwork to quantize subspace information (SI) according to an embodiment of the present disclosure.

FIG. 8 is a view illustrating an example in which set information of a scaling factor and codebook tier information interwork to quantize subspace information according to an embodiment of the present disclosure.

Referring to FIG. 8, the legacy codebook vectors are classified in tiers as in reference numeral 800 of FIG. 8 by a predetermined agreement. For example, when the scaling factor set is given as $\gamma \in \{0.25, 0.5\}$, the legacy codebook tiers are scaled, i.e., reduced as in 810 of FIG. 8, in consistence with $\gamma = 0.25$. Likewise, the legacy codebook tiers are scaled as in 820 of FIG. 8 in consistence with $\gamma = 0.5$. When the terminal reports the index corresponding to $\gamma = 0.5$ and the index corresponding to tier 2 in operation 736, the base station may be aware that the signal subspace boundary of the corresponding terminal corresponds to reference numeral 830 of FIG. 8 among the tiers included in reference numeral 820.

<Subspace Quantization and Reporting Method 3>

Figure 9:
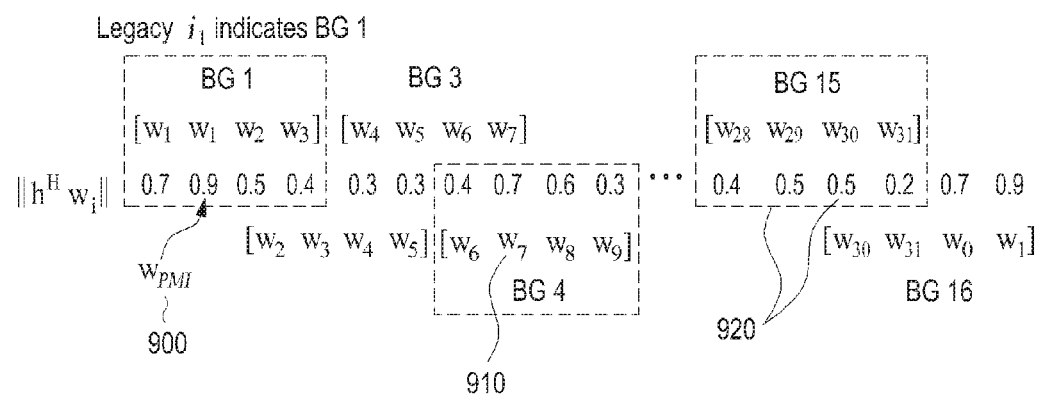
FIG. 9 is a view illustrating an example of quantizing a subspace and reporting information to a base station according to an embodiment of the present disclosure.

FIG. 9 is a view illustrating an example of quantizing a subspace and reporting the information to a base station according to an embodiment of the present disclosure. In the embodiment shown in FIG. 9, it is assumed that the elements configuring the codebook configure a BG in predetermined units.

Referring to FIG. 9, as an example, there are enumerated correlations $\|h^H w_i\|$ between each codebook vector and the channel for each of the elements $w_0, w_1, \ldots, w_7$ configuring the codebook. In this case, as the first PMI $i_1$ indicates BG1 900 including the beam of the direction corresponding to the largest codebook vector $w_1$ whose correlation value is 0.9, the terminal reports the BG most favored by the terminal to the base station. According to an embodiment of the present disclosure, when the terminal should report the subspace information to the base station, it would report, to the base station, BG4 including codebook vector $w_7$ having the second largest correlation value 910, i.e., 0.7, next to the largest correlation value 900 of $w_1$. By contrast, according to an embodiment of the present disclosure, when the terminal should report the noise subspace information to the base station, the terminal would report, e.g., BG15, which has the lowest maximum correlation 920 per BG (when the maximum correlation per BG is the same, one having a lower mean correlation), to the base station as the noise subspace. In the embodiment of FIG. 9, although the subspace information reported from the terminal to the base station would be in the form of PMI $i_1$ as described above, the reporting period might not be limited to that of $i_1$. That is, the terminal may use some timings of $i_1$ or $i_2$ reporting period, a particular period newly defined, or may use event triggering or other various reporting periods and methods to report the subspace information to the base station.

Figure 10:
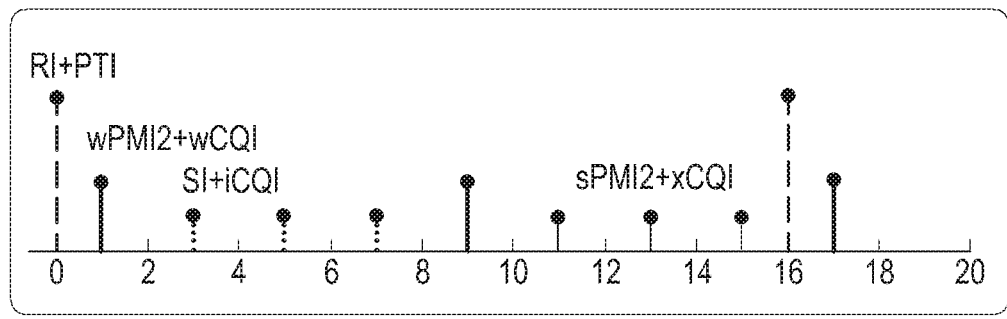
FIG. 10 is a view illustrating an example of a periodic channel state information (CSI) report structure for periodically reporting SI generated according to an embodiment of the present disclosure.
Figure 10:
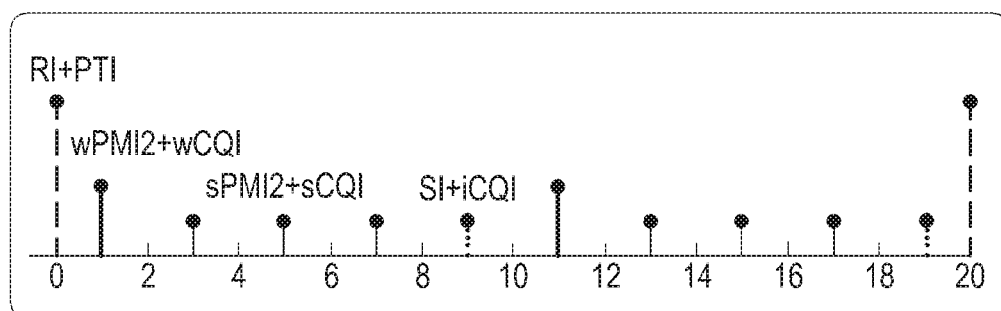

FIG. 10 is a view illustrating an example of a periodic CSI report structure for periodically reporting SI generated according to an embodiment of the present disclosure.

Referring to FIG. 10, according to an embodiment of the present disclosure, a new precoding type indicator (PTI) may be defined to transmit SI as in option 1 or option 2 of FIG. 10. In the case of option 1, the terminal may first report SI and iCQI or nCQI and then report subband second PMI and subband CQI and may repeat in such order. In the case of option 2, according to an embodiment of the present disclosure, the reporting period of wideband CQI/wideband PMI and SI may be controlled by adjusting the parameter N. According to an embodiment of the present disclosure, SI may include at least one of iCQI or nCQI. In the case of option 2, the reporting period of wideband CQI/wideband PMI may be represented as in Equation 13 as an example.

$$H=JK+1+N \qquad \text{Equation 13}$$

Here, H is an integer signaled from the higher layer and is the parameter used for the reporting period of wideband CQI/wideband PMI, J denotes the number of bandwidth parts, and K is also signaled from the higher layer. Here, sequentially reporting subband CQI/subband PMI for the J bandwidth parts may be repeated K times. N may be appreciated as the number of SIs reported between two wideband CQI/wideband PMI reporting periods (reporting instances), as an offset value to adjust H, according to an embodiment of the present disclosure. In this example, N is an example for ease of description, and it may be represented as a function for J when actually applied.

According to an embodiment of the present disclosure, the SI reporting method is not limited to the examples shown in FIG. 10 and may be made to the base station periodically or aperiodically by similar various methods. For example, although FIG. 10 shows that MU CSI is reported by replacing $i_2$ and subband CQI or in association with $i_2$ and subband CQI, such reporting may also be done by replacing $i_1$ or wideband CQI or in association with $i_1$ and wideband CQI. According to an embodiment, the first PMI reported to the base station after the PMI reported from the terminal to the base station has changed may be agreed on to be recognized as PMI for SI by the base station. Alternatively, a particular period and offset may be configured so that $i_1$ or $i_2$ transmitted in the period means MU CSI. The particular period and offset may be independently set for reporting SI or its value may be changed. According to an embodiment of the present disclosure, resources for MU CSI may be configured by various methods such as downlink control information (DCI), radio resource control (RRC), or scheduling request (SR), and the SI may be reported to the base station through the resources.

Figure 11:
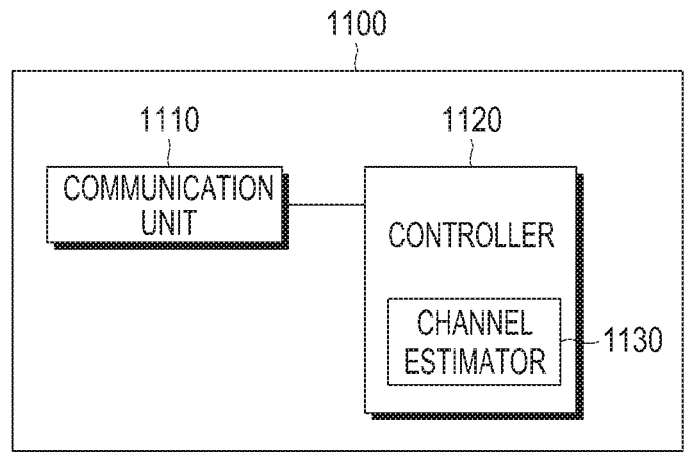
FIG. 11 is a block diagram illustrating an example of an inner structure of a terminal according to an embodiment of the present disclosure.

FIG. 11 is a block diagram illustrating an example of an inner structure of a terminal according to an embodiment of the present disclosure.

Referring to FIG. 11, the terminal 1100 includes a communication unit 1110 that performs a function of transmitting or receiving data from the outside (e.g., a base station). Here, the communication unit 1110 may transmit feedback information for FD-MIMO technology to the base station under the control of a controller 1120. The controller 1120 controls the state and operation of all the components of the UE. Specifically, the controller 1120 generates feedback information for FD-MIMO according to the information allocated by the base station. Further, the controller 1120 controls the communication unit 1110 to feedback the generated channel information to the base station according to the timing information allocated by the base station. To that end, the controller 1120 may include a channel estimator 1130. The channel estimator 1130 determines necessary feedback information through the feedback allocation information and the channel state information-reference signal (CSI-RS) received from the base station and estimates the channel using the received CSI-RS. The channel estimation by the channel estimator 1130 is performed corresponding to the above-described embodiments, and the feedback information is configured corresponding to the above-described embodiments. No detailed description thereof is given. Although in the embodiment of FIG. 11 the UE includes the communication unit 1110 and the controller 1120, the UE may further include various components depending on functions performed thereon without limited thereto. For example, the UE may further include a displaying unit displaying the current state of the UE, an input unit receiving signals such as performing functions from the user, and a storage unit storing data generated in the UE. Further, although the controller 1120 and the channel estimator 1130 are configured in separate blocks as shown, the present disclosure is not limited thereto. For example, the function performed by the channel estimator 1130 may be performed by the controller 1120. In such case, the controller 1120 may measure PMI and CQI pair having two or more different meanings and control the communication unit 1110 to measure the at least one or more reference signals and receive from the base station feedback setting information to generate feedback information as per the measurement result. The controller 1120 may control the communication unit 1110 to transmit the generated feedback information to the base station at a feedback timing as per the feedback setting information.

Figure 12:
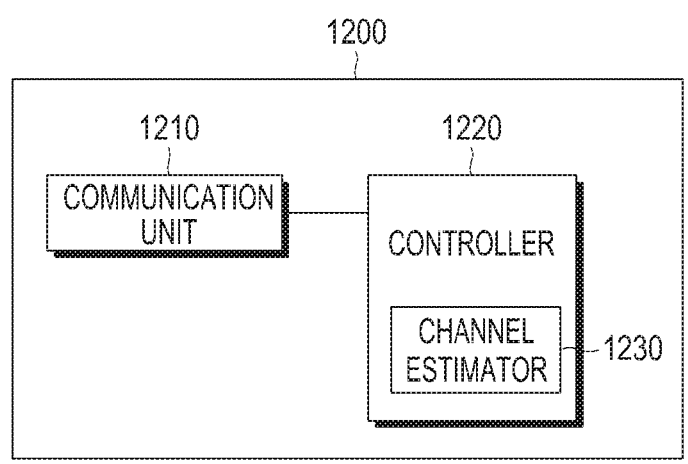
FIG. 12 is a block diagram illustrating an example of an inner structure of a base station according to an embodiment of the present disclosure.

FIG. 12 is a block diagram illustrating an example of an inner structure of a base station according to an embodiment of the present disclosure.

Referring to FIG. 12, the base station 1200 may include a communication unit 1210 and a controller 1220 that controls the state and operation of all the components of the base station. Specifically, the controller 1220 allocates CSI-RS resources to the UE for the horizontal and vertical-component channel estimation of the UE and allocates feedback resources and feedback timing to the UE, according to an embodiment of the present disclosure. For this, the controller 1220 may further include a resource allocator 1230. The resource allocator 1230 allocates CSI-RS to each resource to allow the terminal to estimate each of the vertical and horizontal-component channels and transmits CSI-RS using the corresponding resource, according to an embodiment of the present disclosure. Further, the controller 1220 allocates feedback configuration and feedback timing not to prevent feedback from the UE and receives and interprets the feedback information configured at the corresponding timing. The communication unit 1210 performs the function of communication data, reference signals, and feedback information with the UE. Here, the communication unit 1210 transmits CSI-RSs to the UE through the allocated resources and receives a feedback for the channel information from the UE under the control of the controller 1220. Further, although the controller 1220 and the resource allocator 1230 are configured in separate blocks as shown, the present disclosure is not limited thereto. For example, the function performed by the resource allocator 1230 may be performed by the controller 1220. Further, the controller 1220 may control the communication unit 1210 to transmit to the UE feedback setting information to generate two or more pieces of feedback information. Further, the controller 1220 may control the communication unit 1210 to receive the feedback information transmitted from the UE at a feedback timing according to the feedback setting information. Excessive radio resources may be prevented from allocated in transmitting CSI-RS from base station having a number of transmit antennas such as FD-MIMO, and the terminal may effectively measure channel on the base station having multiple transmit antennas and configure the same in feedback information and notify the base station with the same.

Other Embodiments

Wireless communication system have advanced from voice-centered services to broadband wireless communication systems that provide high data rate and high-quality packet data services, such as 3GPP high speed packet access (HSPA), LTE or evolved universal terrestrial radio access (E-UTRA)), 3GPP2 high rate packet data (HRPD), ultra mobile broadband (UMB), and Institute of Electrical and Electronics Engineers (IEEE) 802.16e communication standards. As a representative example of such a broadband wireless communication system, an LTE system adopts OFDM for downlink and single carrier frequency division multiple access (SC-FDMA) for uplink. Such multiple access scheme allocates and operates time-frequency resources carrying data or control information per user not to overlap, i.e., to maintain orthogonality, to thereby differentiate each user's data or control information. The LTE system adopts a hybrid automatic repeat request (HARQ) scheme that re-transmits corresponding data through the physical layer when decoding fails at the initial stage of transmission. By the HARQ scheme, if the receiver fails to precisely decode data, the receiver transmits information indicating the decoding failure negative acknowledgement (NACK) to the transmitter so that the transmitter may re-transmit the corresponding data through the physical layer. The receiver raises the data reception capability by combining the data re-transmitted by the transmitter with the data for which decoding has failed. Further, when the receiver precisely decodes data, the receiver may transmit information indicating that the decoding succeeds acknowledgement (ACK) to the transmitter so that the transmitter may transmit new data. Further, the LTE system adopts the scheme of allocating resources to the terminal depending on channel states in order to enhance downlink reception capability. The base station may transmit CSI-RS on downlink to assign resources according to the channel state of the terminal. Further, the base station may send a request for periodic CSI reporting (P-CSI report) and aperiodic CSI reporting (A-CSI report) to the terminal, and the terminal may measure the channel and periodically or aperiodically report the configured CSI to the base station. The terminal having received the CSI report from the base station may measure, e.g., CQI corresponding to the CSI, PMI, and rank indicator (RI) based on the CSI-RS or cell-specific reference signal (CRS) depending on the CSI-RS configuration and the transmission mode of the terminal. The base station may assign the optimal frequency resource to the terminal based on the CQI received from the terminal.

Figure 13:
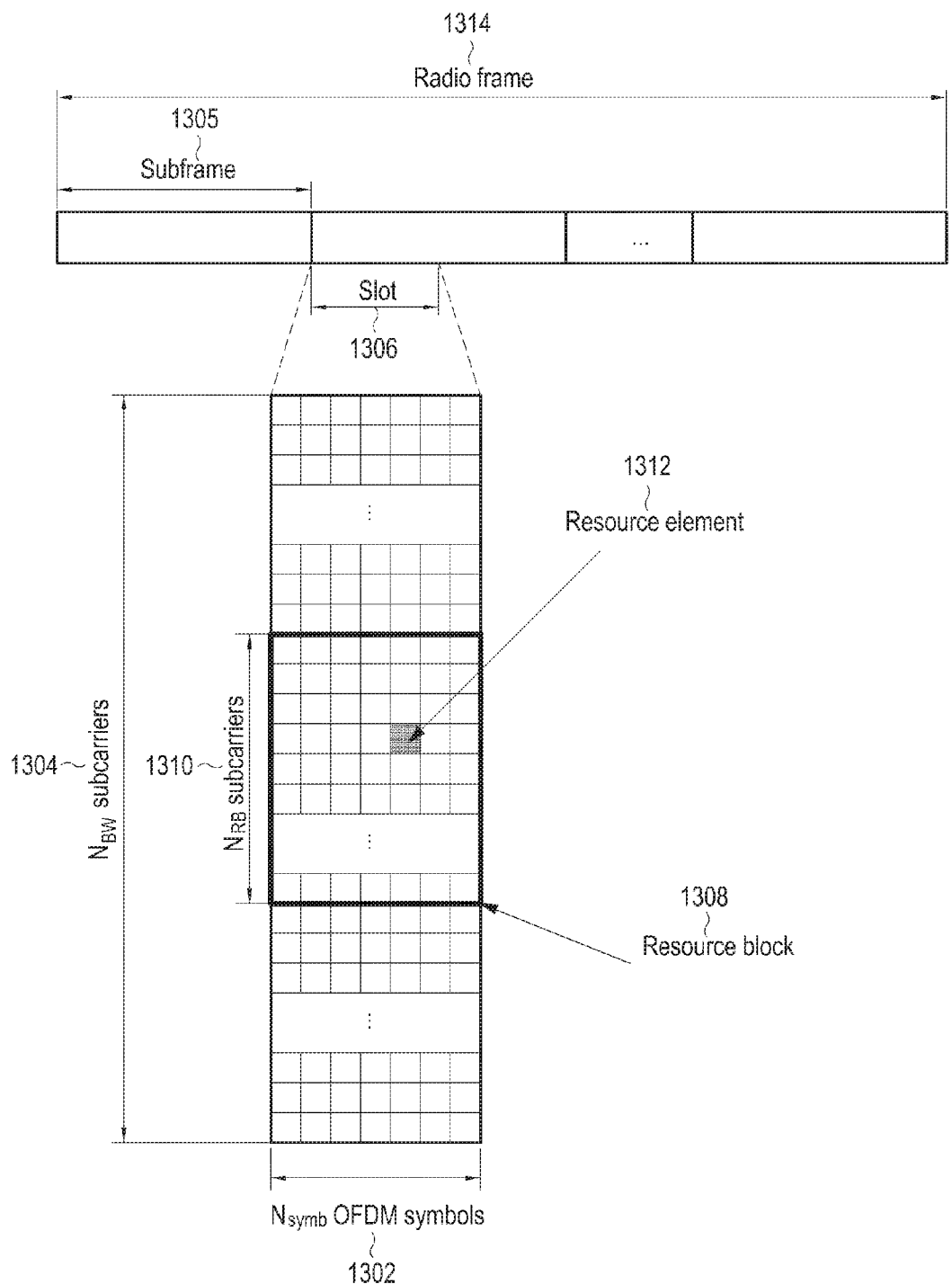
FIG. 13 is a view illustrating a basic structure of a time-frequency domain which is a radio resource domain where a data or control channel is transmitted on downlink in a long-term evolution (LTE) system.

FIG. 13 is a view illustrating a basic structure of a time-frequency domain which is a radio resource domain where a data or control channel is transmitted on downlink in a legacy LTE system according to an embodiment of the present disclosure.

Referring to FIG. 13, the horizontal axis refers to the time domain, and the vertical axis refers to the frequency domain. In the time domain, the minimum transmission unit is an OFDMA symbol, and Nsymb (1302) OFDMA symbols come together to configure one slot 1306, and two slots come together to configure one subframe 1305. The slot is 0.5 ms long, and the subframe is 1.0 ms long. The radio frame 1314 is a time domain unit consisting of ten subframes. In the frequency domain, the minimum transmission unit is subcarrier, and the bandwidth of the overall uplink system transmission band consists of a total of $N_{BW}$ (1304) subcarriers. The basic resource unit in the time-frequency domain is a resource element (RE) 1312, and this may be represented in an OFDMA symbol index and subcarrier index. Resource block (RB) 1308 or physical RB (PRB) is defined with Nsymb (1302) continuous OFDMA symbols in the time domain and $N_{RB}$ (1310) continuous subcarriers in the frequency domain. Accordingly, one RB 1308 includes Nsymb×$N_{RB}$ REs (1312). Generally, the minimum transmission unit of data is RB. Generally in the LTE system, Nsymb=7, $N_{RB}$=12, and, $N_{BW}$ and $N_{RB}$ are proportional to the bandwidth of system transmission band. Data rate is increased in proportion to the number of RBs scheduled for the terminal. The LTE system defines and operates six transmission bandwidths. For a frequency division duplex (FDD) system differentiating and operating downlink and uplink with frequencies, downlink transmission bandwidth may differ from uplink transmission bandwidth. The channel bandwidth refers to an RF bandwidth corresponding to the system transmission bandwidth.

Table 1 represents a correlation between system transmission bandwidth and channel bandwidth defined in the LTE system. For example, the LTE system having a 10 MHz channel bandwidth has a transmission bandwidth consisting of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The LTE system supports the following modulation schemes: quadrature phase shift keying (QPSK), 16QAM quadrature amplitude modulation (QAM), 64QAM, and their respective modulation orders (Qm) are 2, 4, and 6. That is, QPSK may transmit two bits per symbol, 16QAM four bits per symbol, and 64QAM six bits per symbol. The LTE system operating as above may support lower-cost/lower-complexity terminals (UEs) by limiting some functions of the terminal. Hereinafter, low-cost, low-complexity terminals are referred to as low-cost terminals for ease of description. Low-cost terminals are anticipated to be appropriate for machine-type communication (MTC) or machine-to-machine (M2M) services for remote metering, security, or logistics. Further, low-cost terminals are expected as means to implement cellular-based Internet of things (IoT). For low costs or low complexity, the number of receive antennas of a terminal may be limited to one, to reduce costs of RF components of the terminal or RBs processable by the present disclosure may be set with an upper cap to reduce costs of a data receiving buffer of the terminal. Common LTE terminals are equipped with broadband signal communication functionality for a minimum of 20 MHz band regardless of the system transmission bandwidth, and by comparison, low-cost terminals are limited as having 20 MHz or less maximum bandwidth to lead to additional cost savings and reduced complexity. For example, in the 20 MHz channel bandwidth LTE system, low-cost terminals only supportive of 1.4 MHz channel bandwidth may be defined for their operation. Low-cost terminals may be located in the shadow area of a building where there is smaller mobility and people cannot reach as per MTC/M2M services or IoT services. Thus, low-cost terminals need a method for enhancing coverage. For example, when a terminal needing coverage enhancement needs a coverage enhancement of about 15 dB relative to that of a legacy terminal, a new physical channel meeting coverage enhancement may be used or legacy physical channels may be repeated or bundled and used for communication between a base station and a terminal. Here, repetitive transmission denotes repeatedly transmitting the same physical channel, and bundling denotes repeatedly transmitting the same information with different HARQ redundancy versions (RVs) or other physical channel formats. When repetitive transmission and bundling are simultaneously used, it means transmission that is repeatedly performed through physical channels but with different HARQ redundancy versions or different physical channel formats. The receivers of the base station and the terminal may enjoy enhanced coverage through soft combining or accumulation of the physical channels transmitted repeatedly or bundled rather than through normal physical channels. In describing other embodiments of the present disclosure, the above-described repetition and bundling are deemed to be similar, and thus, even when one of the two is mentioned, it is assumed to encompass both the repetition and bundling. Further, although the methods, techniques, or terminal operations and structures for enhancing coverage are described primarily for low-cost terminals, the methods, techniques, or terminal operations and structures for coverage enhancement according to the present disclosure may likewise apply to legacy normal terminals needing coverage enhancement, which are not low-cost terminals. As described above, a low-cost terminal needing coverage enhancement requires repeated transmission and reception of a physical channel to receive communications with the base station, and thus, a transmission time interval (TTI) for transmitting one physical channel rises to a plurality of subframes. The repetitive transmission count for coverage enhancement of physical channel may vary depending on the signal to noise ratio (SNR) required per physical channel or maximum coupling ratio (MCL). For example, assuming that the low-cost terminal requires a coverage enhancement of 15 dB relative to the coverage of the legacy terminal, the capability enhancement required for physical downlink control channel (PDCCH) may differ from the capability enhancement required for physical downlink shared channel (PDSCH), and the PDCCH may be different in the number of repetitive transmissions from the PDSCH. Further, since the degree of coverage enhancement required by the low-cost terminal may vary depending on circumstances, the repetitive transmission may vary, even for a single terminal, depending on times and places. Accordingly, for the low-cost terminal, a control and data channel communication operation needs to be defined which is different for the legacy LTE terminal with a subframe as the basic unit of TTI. The number of times of repetitive transmission necessary for extending or enhancing coverage may be set for the terminal through a coverage enhancement level. The base station may determine the coverage enhancement level depending on reporting by the terminal or reception circumstance and set for the terminal. The base station may indicate four coverage enhancement levels, and the base station may set for the terminal a proper level depending on the context of the terminal. One level may be connected to the number of repetitions of each physical channel, and the terminal may also determine the number of repetitions of the physical channel depending on the coverage level. Such coverage enhancement level may be set for each terminal through RRC signaling by the base station or may be allocated dynamically through, e.g., downlink control information (DCI) upon PDSCH or PUSCH scheduling. Further, the base station may determine the coverage enhancement mode depending on reporting by the terminal or reception circumstance and set the same. The case where the terminal has coverage similar to that of a normal terminal so that there is no need of repetition of physical channel or only a small number of repetitions than a threshold is required for coverage enhancement is defined as coverage enhancement mode A, and the case where the terminal requires a larger number of repetitions than a threshold for coverage enhancement is defined as coverage enhancement mode B. The base station may set coverage enhancement mode A or coverage enhancement mode B for the terminal depending on the context of the terminal. The terminal may perform different operations depending on which coverage enhancement mode is set. For example, the size of DCI bit received by the terminal may vary depending on coverage enhancement modes, and the terminal should attempt DCI blind detection assuming the DCI size corresponding to the coverage enhancement mode set for the terminal. An example of another communication operation of control and data channel required by a low-cost terminal needing coverage enhancement may be CSI reporting for assigning resources to the terminal depending on channel states for the base station to enhance the downlink reception capability of the terminal needing coverage enhancement. First, when the terminal needing coverage enhancement periodically transmits P-CSI reports to the base station, the time for transmitting the P-CSI reports increases, resulting in increased power consumption. Thus, according to an embodiment of the present disclosure, the terminal needing coverage enhancement may be restricted to perform CSI reporting using only A-CSI report. As a specific example, the terminal for which coverage enhancement mode A has been set may perform P-CSI and A-CSI reporting, but the terminal having coverage enhancement mode B set therefor may perform only A-CSI reporting. In the case of legacy terminals, when the base station sends an A-CSI report request to a particular terminal, the terminal configures a particular frequency resource (or RB group) in one subframe including the A-CSI report request as a CSI reference resource, measures a CQI value meeting a block error rate (BLER) of 10% in the CSI reference resource, and sends the same to the base station. In the LTE system, the base station may indicate the A-CSI report to the terminal by setting the bit indicating the A-CSI report request to 1 in DCI format 0 for authorizing uplink scheduling. In the above case, the subframe where DCI format 0 is transmitted may be the CSI reference resource.

Figure 14:
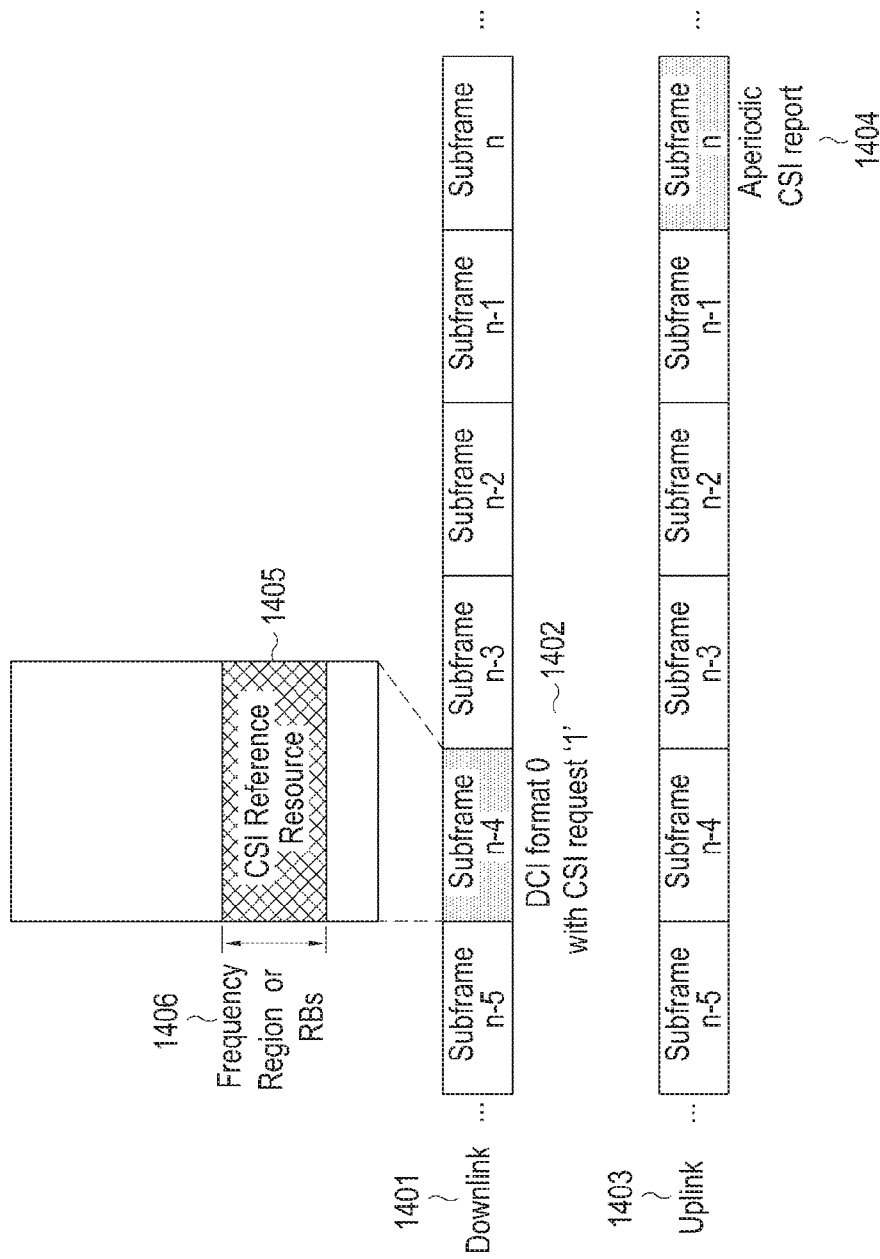
FIG. 14 is a view illustrating a relationship between a CSI reference resource and a downlink and uplink timing related to an aperiodic-CSI (A-CSI) report in a general LTE frequency division duplex (FDD) system according to an embodiment of the present disclosure.

FIG. 14 is a view illustrating a relationship between a CSI reference resource and a downlink and uplink timing related to the A-CSI report in a general LTE FDD system according to an embodiment of the present disclosure.

Referring to FIG. 14, it is assumed that DCI format 0 having the CSI request field set to 1 in subframe n-4 (1402) on downlink 1401 is scheduled for one terminal. In this case, the terminal transmits the A-CSI report through PUSCH in subframe n 1404 of uplink 1403. According to an embodiment of the present disclosure, the terminal may calculate, e.g., CQI, PMI, and RI which may meet BLER 10% with respect to the CSI reference resource 1405 to transmit A-CSI report to the base station. According to an embodiment of the present disclosure, the terminal may calculate CQI, PMI, and RI by performing measurement with respect to the CRS or CSI-RS included in the CSI reference resource 1405. The CSI reference resource 1405 may be set to subframe n-4 1402 where DCI format 0 with the CSI request field set to 1 is transmitted in the time domain and may be set through a particular frequency domain or RB group 1406 set through RRC signaling. In the legacy LTE system, the terminal having received the A-CSI report request from the base station sets the subframe where corresponding DCI format 0 is transmitted to one subframe including the CSI reference resource. However, since DCI format 0 for configuring uplink resources for the terminal needing coverage enhancement is repeatedly transmitted in several subframes, there is required a new definition as to which one of the multiple subframes repeatedly transmitted should be set as the CSI reference resource. Further, according to an embodiment of the present disclosure, when the terminal according to the present disclosure uses a frequency smaller than the system frequency bandwidth, there is a need of a new definition as to which one of multiple narrow bands present in the system transmission bandwidth is set as the resource source. Further, the LTE system including the terminal needing coverage enhancement requires a terminal operation and procedure depending on a new CSI reference resource configuration different from that of the legacy LTE system. Accordingly, according to an embodiment of the present disclosure, there are proposed a new definition for a CSI reference resource for a terminal to measure A-CSI when a base station sends a request for A-CSI report for assigning time and frequency depending on the channel state of the terminal for a terminal needing uplink and downlink coverage enhancement, a specific method, and operation by the terminal according to the definition. Further, embodiments of the present disclosure propose a method for configuring a CSI reference resource appropriate for a terminal needing coverage enhancement when data and control channel transmission occurs during one or more subframes of TTI when the terminal needing coverage enhancement transmits control channel and data channel through downlink and provides a method and procedure for measuring A-CSI report by the terminal according to the same.

Figure 15:
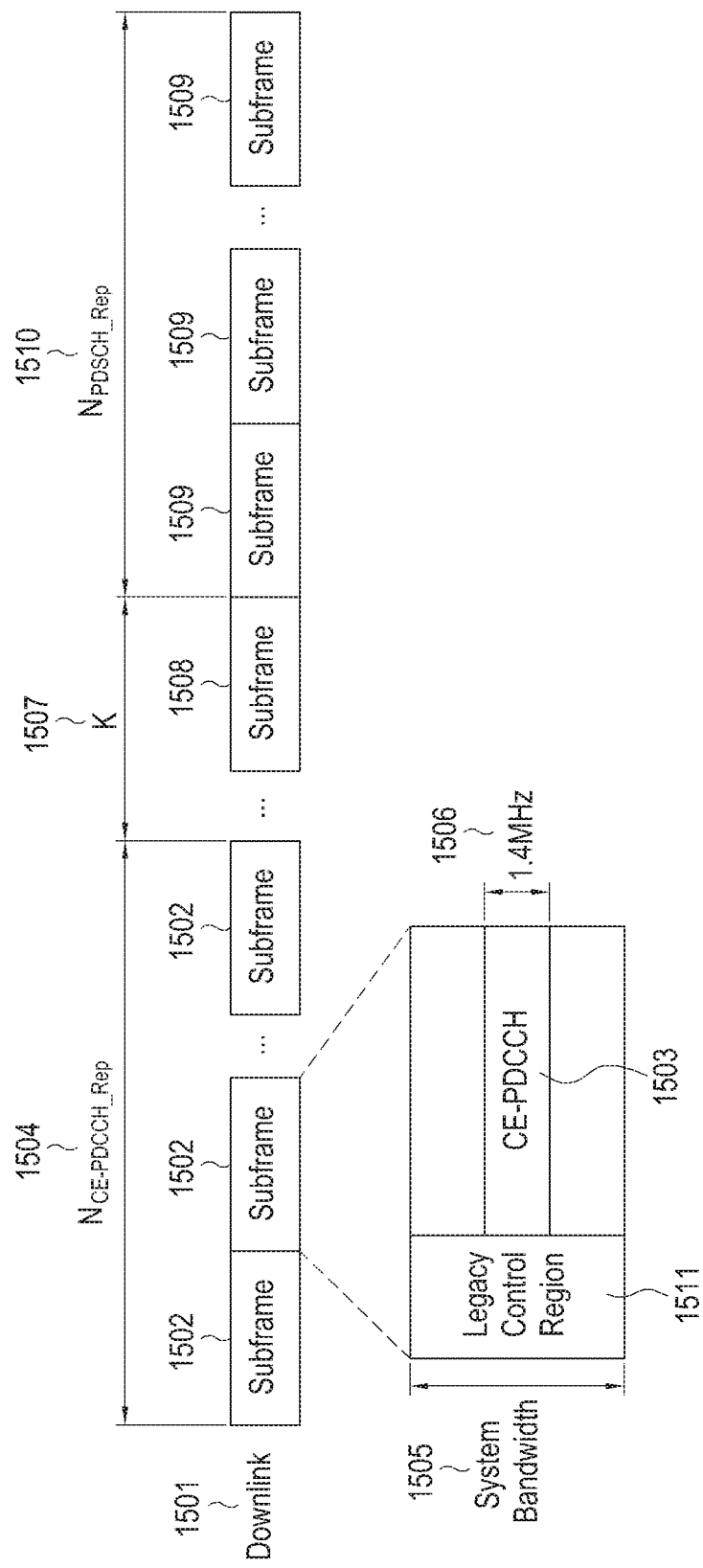
FIG. 15 is a view illustrating a resource structure and transmission timing of a downlink control channel and downlink data channel to transmit a downlink data channel to a low-cost terminal needing coverage enhancement in an LTE system according to an embodiment of the present disclosure.

FIG. 15 is a view illustrating a resource structure and transmission timing of a downlink control channel and downlink data channel to transmit a downlink data channel to a low-cost terminal needing coverage enhancement in an LTE system according to an embodiment of the present disclosure.

Referring to FIG. 15, a control signal is transmitted to the low-cost terminal needing coverage enhancement through multiple subframes 1502 assigned for control channel on the downlink 1501. According to an embodiment of the present disclosure, the control channel transmitted to the low-cost terminal needing coverage enhancement is named a coverage enhancement PDCCH (CE-PDCCH) 1503 (or may also be named low-cost PDCCH (LC-PDCCH) or MTC-PDCCH (M-PDCCH)). According to an embodiment of the present disclosure, the CE-PDCCH 1503 may be repeated in $N_{CE\text{-}PDCCH\_Rep}$ (1504) subframes 1502 according to the repetition level configured per terminal through RRC signaling by the base station.

Further, according to an embodiment of the present disclosure, the CE-PDCCH 1503 may start to be repeated from a particular subframe configured by the base station in order to reduce the complexity of detecting the CE-PDCCH 1503 by the terminal, and to that end, the CE-PDCCH repetition period and the start subframe of the CE-PDCCH repetition may be configured commonly for cells through RRC signaling. For the low-cost terminal needing coverage enhancement, the CE-PDCCH 1503 may be transmitted within 1.4 MHz 1506 that is the reception capability of the terminal regardless of the system bandwidth 1505 of the base station. Further, according to an embodiment of the present disclosure, it may be subject to frequency hopping and transmission per subframe in order to be transmitted within the same 1.4 MHz frequency per subframe or to obtain a performance gain such as diversity. Further, according to an embodiment of the present disclosure, the low-cost terminal needing coverage enhancement cannot receive control channel, i.e., PDCCH, for the legacy terminal which is transmitted on the overall system bandwidth. Thus, according to an embodiment of the present disclosure, the CE-PDCCH 1503 starts from the OFDM symbol except for the legacy control region 1511. Here, the number of OFDM symbols used to transmit legacy control region 1511 may be reported to the terminal through the master information block (MIB) or system information block (SIB) transmitted through the physical broadcast channel (PBCH).

According to an embodiment of the present disclosure, when the DCI related to downlink data resource allocation is transmitted through the CE-PDCCH 1503, the terminal may receive the PDSCH through the subframes 1509 that are repeated $N_{PDSCH\_Rep}$ (1510) times after k (1507) subframe 1508. Here, k 1507 is a fixed number of subframes corresponding to the RF returning time required for each terminal to change the center frequency and the CE-PDCCH (1503) processing time by the terminal and may be previously set between the base station and the terminal. According to an embodiment of the present disclosure, k 1507 may be set for the terminal through RRC signaling by the base station. Further, $N_{PDSCH\_Rep}$ (1510) may also be set for the terminal through RRC signaling by the base station depending on the degree of PDSCH coverage enhancement required for the terminal. According to an embodiment of the present disclosure, the base station may previously report a set of available repetition counts to the terminal through RRC signaling and may dynamically designate one of such sets of repetition counts as $N_{PDSCH\_Rep}$ (1510) through the DCI and report the same to the terminal.

Figure 16:
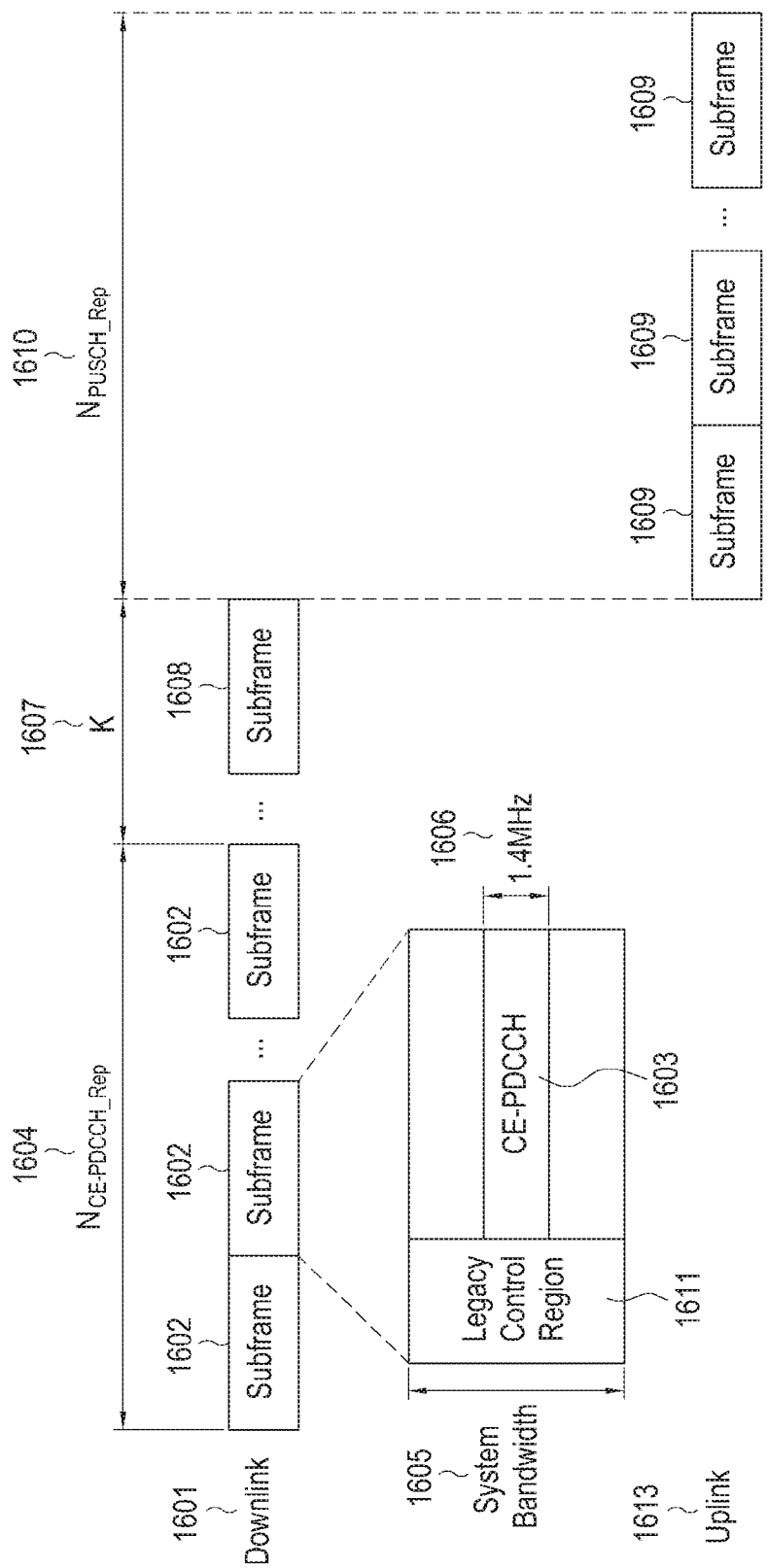
FIG. 16 is a view illustrating a resource structure and transmission timing of a downlink control channel and uplink data channel to assign an uplink data channel to a terminal needing coverage enhancement in an LTE system according to an embodiment of the present disclosure.

FIG. 16 is a view illustrating a resource structure and transmission timing of a downlink control channel and uplink data channel to assign an uplink data channel to a terminal needing coverage enhancement in an LTE system according to an embodiment of the present disclosure.

Referring to FIG. 16, a control signal is transmitted to the terminal needing coverage enhancement through multiple subframes 1602 assigned for the control channel on the downlink 1601. Here, according to an embodiment of the present disclosure, the CE-PDCCH 1603 may be repeated in $N_{CE\text{-}PDCCH\_Rep}$ (1604) subframes 1602 according to the repetition level configured per terminal through RRC signaling by the base station. Further, according to an embodiment of the present disclosure, the CE-PDCCH 1603 may start to be repeated from a particular subframe configured by the base station in order to reduce the complexity of detecting the CE-PDCCH 1603 by the terminal, and to that end, the CE-PDCCH repetition period and the start subframe of the CE-PDCCH repetition may be configured commonly for cells through RRC signaling. According to an embodiment of the present disclosure, for the low-cost terminal needing coverage enhancement, the CE-PDCCH 1603 may be transmitted within 1.4 MHz 1606 that is the reception capability of the terminal regardless of the system bandwidth 1605 of the base station. Further, according to an embodiment of the present disclosure, the CE-PDCCH 1603 may be transmitted per subframe in the same 1.4 MHz frequency or may be subject to frequency hopping and transmission per subframe in order to obtain a performance gain such as diversity. Further, the low-cost terminal needing coverage enhancement cannot receive PDCCH for the legacy terminal transmitted on the overall system bandwidth, and thus, the CE-PDCCH 1603 according to an embodiment of the present disclosure starts from the OFDM symbol except for the legacy control region 1611. Here, the number of OFDM symbols used to transmit the legacy control region 1611 may be known to the terminal through MIB or SIB transmitted through PBCH according to an embodiment of the present disclosure.

In the embodiment of FIG. 16, when the CE-PDCCH 1603 includes DCI format related to uplink data resource allocation, the terminal may transmit PUSCH for uplink data transmission 1613 through the subframes 1609 that are repeated $N_{PUSCH\_Rep}$ (1610) times after the K (1607) subframes 1608. Here, k 1607 may be, e.g., four subframes, which are previously set between the base station and the terminal considering the CE-PDCCH reception processing time or may be transferred to all the terminals as a commonly set value through system information by the base station, according to an embodiment of the present disclosure. Further, according to the embodiment of FIG. 16, $N_{PUSCH\_Rep}$ (1610) may also be set for the terminal through RRC signaling by the base station depending on the degree of PUSCH coverage enhancement required for the terminal. According to an embodiment of the present disclosure, for $N_{PUSCH\ Rep}$ 1610, the base station may previously report a set of available repetition counts to the terminal through RRC signaling and may dynamically designate one of such sets of repetition counts as $N_{PDSCH\_Rep}$ (1510) through the DCI and report the same to the terminal.

As shown in FIG. 16 according to an embodiment of the present disclosure, for the low-cost terminal needing coverage enhancement, the CE-PDCCH 1603 transmitting the DCI format related to uplink data resource allocation is transmitted through multiple subframes 1602. Accordingly, when the DCI format sends a request for A-CSI report to the terminal, there is a need for an exact CSI reference resource definition for the terminal to measure CSI. For example, it is assumed that CSI reporting to the base station is performed using the CSI reference resource received through one subframe arbitrarily selected by the terminal among multiple subframes 1602 for transmitting the CE-PDCCH 1603 according to an embodiment of the present disclosure. Since the base station cannot identify the selected subframe and is thus not aware of the measurement time reference for the reported CSI, such problem may arise where exact downlink resource scheduling is impossible. Further, for the CSI reference resource for CSI measurement, at least two subframes are arbitrarily selected from among the subframes 1602, and reporting to the base station is conducted using the CSI reference resources received through the selected subframes, the base station cannot identify the number of subframes used for CSI reference resource. Accordingly, also in such a case, the base station might not perform exact downlink resource scheduling. Accordingly, according to an embodiment of the present disclosure, when CE-PDCCH 1603 is transmitted through multiple subframes for coverage enhancement of CE-PDCCH 1603 according to an embodiment of the present disclosure, there are proposed a method for selecting CSI reference resource for A-CSI report, and method and apparatus for measuring and reporting CSI using the selected CSI reference resource.

First Embodiment

Figure 17:
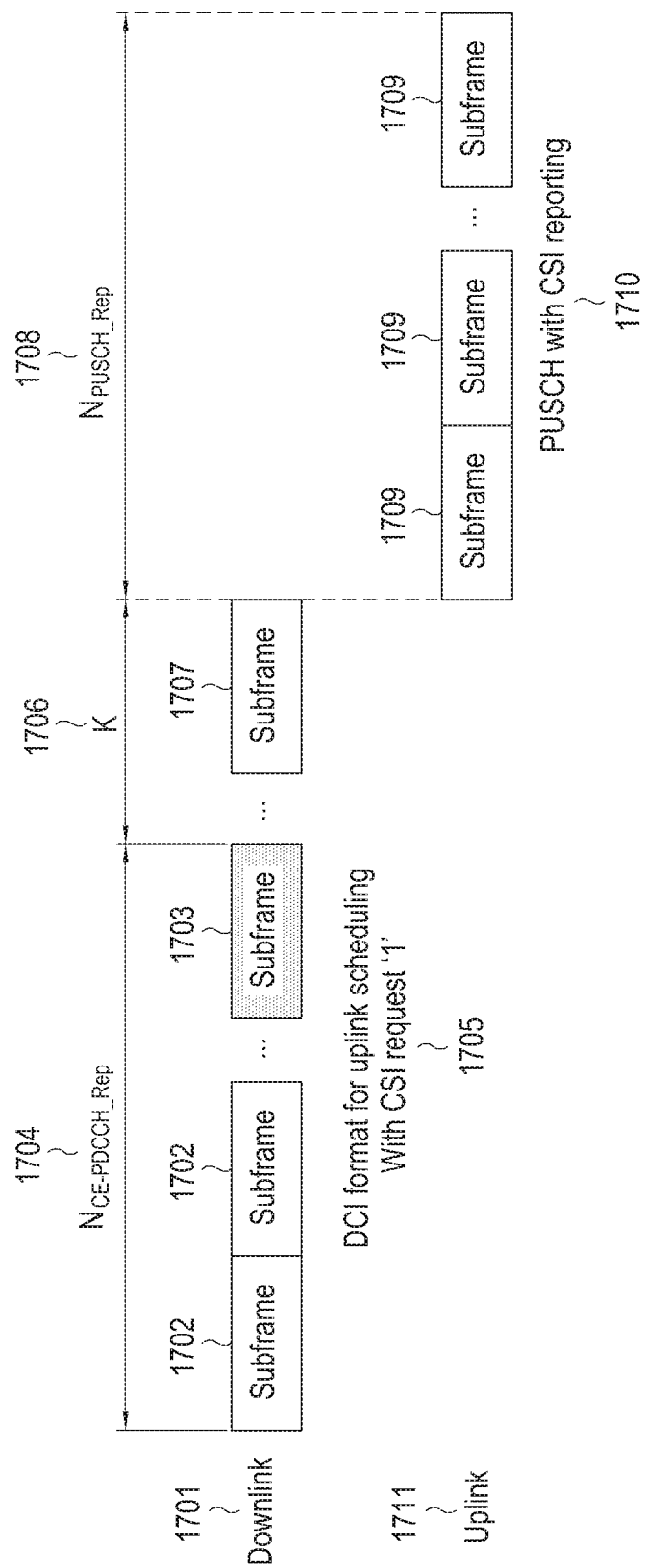
FIG. 17 is a view illustrating an example of an A-CSI report transmission timing and CSI reference resource timing including one subframe when a terminal needing coverage enhancement receives a request for A-CSI report from a base station in an LTE system according to a first embodiment of the present disclosure.

FIG. 17 is a view illustrating an example of an A-CSI report transmission timing and CSI reference resource timing including one subframe when a terminal needing coverage enhancement receives a request for A-CSI report from a base station in an LTE system according to an embodiment of the present disclosure.

Referring to FIG. 17, a CE-PDCCH is transmitted to the terminal needing coverage enhancement through multiple subframes 1702 and 1703 assigned for control channel on the downlink 1701 and DCI 1704 is transmitted through the CE-PDCCH. In this case, it is assumed that according to the first embodiment of the present disclosure the A-CSI request field included in the DCI 1704 is set to 1. The terminal may select, e.g., the last subframe 1703 among the subframes 1702 and 1703 used for transmission of CE-PDCCH and may use the CSI reference resource obtained through the selected subframe 1703 for CSI measurement. In the embodiment of FIG. 17, described is an example in which the subframe 1703, which is the last subframe of the subframes 1702 and 1703 used for transmission of CE-PDCCH is allocated to the subframe used as CSI reference resource. However, the position of the subframe used as CSI reference resource is not limited to the last subframe, according to an embodiment of the present disclosure, and alternatively, it may be positioned in any one of the $N_{CE\text{-}PDCCH\ Rep}$ (1705) subframes necessary for transmission of CE-PDCCH. Specifically, the subframe used as CSI reference resource may be configured by one of the following methods according to an embodiment of the present disclosure.

Method 1-1: According to method 1-1 of the first embodiment of the present disclosure, as the position of the subframe 1703 used as CSI reference resource, the base station may set one of the subframes 1702 and 1703 used for transmission of CE-PDCCH as subframe common per cell. Accordingly, the terminals positioned in the cell of the base station may recognize the same subframe, e.g., the last subframe 1703, as the subframe carrying the CSI reference resource.

Method 1-2: According to method 1-2 of the first embodiment of the present disclosure, as the position of the subframe 1703 used as CSI reference resource, the base station may set one of the subframes 1702 and 1703 used for transmission of CE-PDCCH as a different subframe for each terminal.

Method 1-3: According to method 1-3 of the first embodiment of the present disclosure, the position of the subframe 1703 used as CSI reference resource may be previously set between the base station and terminal as one of the subframes 1702 and 1703 used for transmission of CE-PDCCH.

Method 1-4: According to method 1-4 of the first embodiment of the present disclosure, the position of the subframe 1703 used as CSI reference resource may be set as the Nth subframe from the repetition start subframe of CE-PDCCH when the terminal succeeds in receiving the CE-PDCCH transmitted through N subframes, wherein N is smaller than $N_{CE\text{-}PDCCH\_Rep}$. Alternatively, when reception of CE-PDCCH through $N_{CE\text{-}PDCCH\_Rep}$ subframes succeeds, the last subframe of the $N_{CE\text{-}PDCCH\_Rep}$ (1704) subframes may be set as the subframe used as CSI reference resource.

When the last subframe of the subframes 1702 and 1703 used for transmission of CE-PDCCH is set as the subframe 1703 used as CSI reference resource using one of the above methods, the base station may be aware of the CSI positioned at the closest time to the time when CSI report is received. Accordingly, upon allocation of downlink data transmission resource of the terminal, a higher frequency scheduling gain may be obtained.

When the subframe 1703 used as CSI reference resource is set to the first subframe among the subframes 1702 and 1703 used for transmission of the CE-PDCCH using one of the above methods, if the terminal needing coverage enhancement succeeds in receiving the CE-PDCCH with a smaller number of subframes fewer than the $N_{CE\text{-}PDCCH\_Rep}$ (1705) subframes in receiving the CE-PDCCH, it is not required to receive all of the $N_{CE\text{-}PDCCH\_Rep}$ (1705) subframes, thus leading to reduced power consumption.

For the position of the subframe used as CSI reference resource configured according to an embodiment of the present disclosure, the base station may use one of the signaling methods for the terminal.

Method 2-1: According to method 2-1 of the first embodiment of the present disclosure, the bit indicating the position of the sf 1703 used as CSI reference resource of the bitmap having a length of $N_{CE\text{-}PDCCH\_Rep}$ (1705) may be set to 1.

Method 2-2: According to method 2-2 of the first embodiment of the present disclosure, the value indicating the subframe 1703 used as CSI reference resource among the $N_{CE\text{-}PDCCH\_Rep}$ subframes may be included in the first subframe used for repetitive transmission of CE-PDCCH. For example, the first subframe of the $N_{CE\text{-}PDCCH\_Rep}$ subframes may be denoted as 1, and the second subframe as 2, and in such manner, the last subframe may be denoted as "$N_{CE\text{-}PDCCH\_Rep}$" and among them, the number indicating the subframe 1703 may be set in the first subframe.

According to an embodiment of the present disclosure, by one of methods 2-1 and 2-2, the subframe used as CSI reference resource may be indicated while the DCI may be used to dynamically configure CSI reference resource per terminal through RRC signaling and may be commonly configured for the terminal through system information.

According to the first embodiment of the present disclosure, the terminal needing coverage enhancement obtains the location information on the subframe allocated as CSI reference resource configured through one of methods 2-1 or 2-2, obtains the CSI reference resource in the subframe corresponding to the location information obtained, and measures CSI, such as CQI, PMI, and RI, in the 1.4 MHz bandwidth where CE-PDCCH is transmitted based on the obtained CSI reference resource. When CSI-RS is transmitted in the corresponding CSI reference resource, the terminal may measure CSI using CSI-RS, CRS, and demodulation-RS. Further, when no CSI-RS is transmitted in the corresponding CSI reference resource, the terminal may measure CSI using CRS and demodulation-RS.

According to an embodiment of the present disclosure, the 1.4 MHz narrow band where the terminal needing coverage enhancement measures CSI may be measured with respect to the narrow band where the terminal needing coverage enhancement receives CE-PDCCH. When performing frequency hopping in receiving CE-PDCCH, the terminal may measure CSI per narrow band where CE-PDCCH is transmitted or calculate the value measured in each narrow band as average CSI.

Meanwhile, according to an embodiment of the present disclosure, the terminal needing coverage enhancement, which has measured CSI, may transmit the measured CSI report through the PUSCH 1710 for uplink (1711) data transmission after k (1706) subframes 1707. Here, the PUSCH 1710 transmitting the CSI report may be transmitted in the subframe 1709 repeated $N_{PUSCH\_Rep}$ (1708) times. Here, k 1706 is the number of fixed subframes considering, e.g., CE-PDCCH reception processing time or CSI measurement time of the terminal, and for example, four subframes may be previously set between the base station and terminal or may be known to the terminal through RRC signaling by the base station. k 1706 may be set to other value than four subframes.

Second Embodiment

Figure 18:
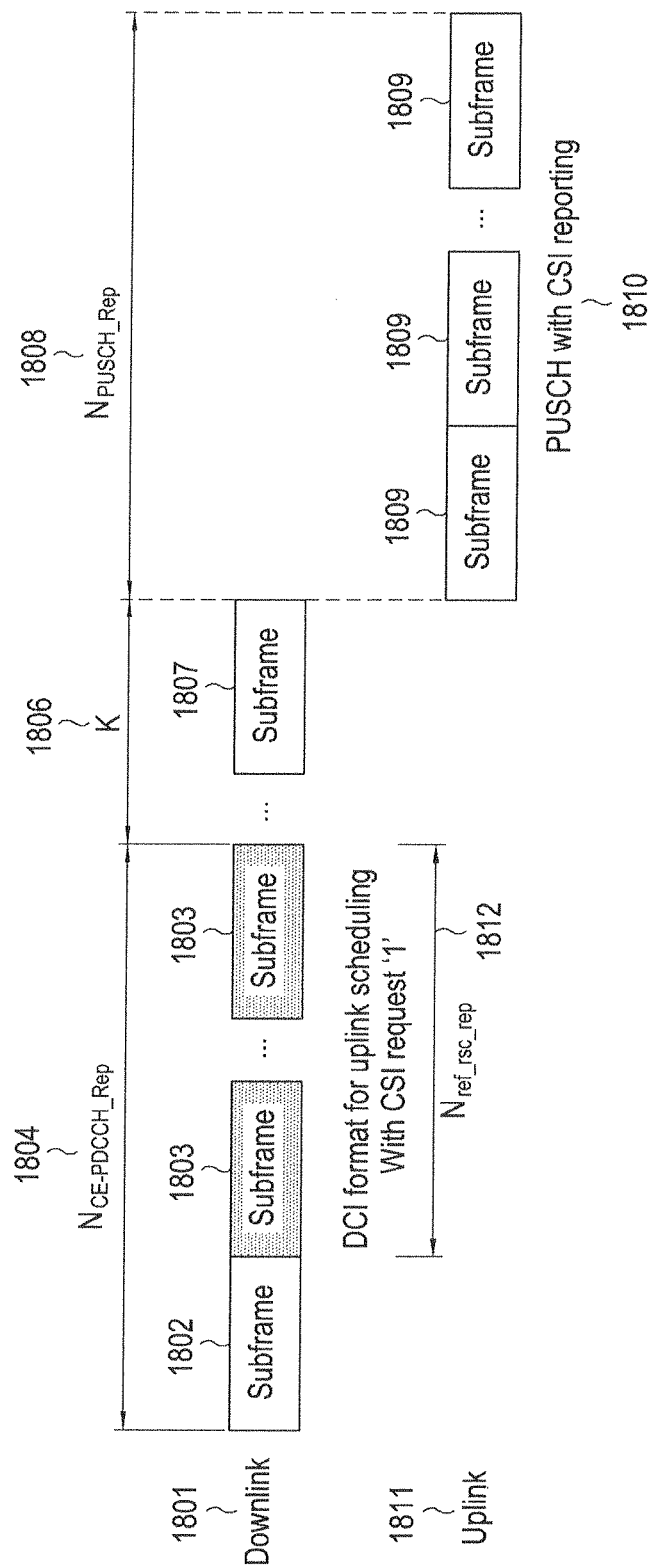
FIG. 18 is a view illustrating another example of an A-CSI report transmission timing and CSI reference resource timing including several subframes considering repetitive transmission when a terminal needing coverage enhancement receives a request for A-CSI report from a base station in an LTE system according to a second embodiment of the present disclosure.

FIG. 18 is a view illustrating another example of an A-CSI report transmission timing and CSI reference resource timing including several subframes considering repetitive transmission when a terminal needing coverage enhancement receives a request for A-CSI report from a base station in an LTE system according to an embodiment of the present disclosure.

Referring to FIG. 18, a CE-PDCCH is transmitted to the terminal needing coverage enhancement through multiple subframes 1802 and 1803 assigned for control channel on the downlink 1801 and DCI 1804 is transmitted through the CE-PDCCH. In this case, it is assumed that according to the second embodiment of the present disclosure the A-CSI request field included in the DCI 1804 is set to 1. Then, the terminal may use the CSI reference resource obtained from $N_{ref\_rsc\_rep}$ (1812) continuous subframes 1803 among the subframes 1802 and 1803 used for transmission of CE-PDCCH to measure CSI.

According to the second embodiment of the present disclosure, the terminal may be aware of the number of consecutive subframes 1803, $N_{ref\_rsc\_rep}$ (1812), used as CSI reference resource by one of the following methods, and among methods 3-1, 3-2, and 3-3, the terminal may use a fixed method or a method configured for the terminal by the base station.

Method 3-1: $N_{ref\_rsc\_rep}$ (1812)=$N_{CE\text{-}PDCCH\_Rep}$ (1804), that is, according to method 3-1 of the second embodiment of the present disclosure, $N_{ref\_rsc\_rep}$ (1812) may be set to be equal to the number of subframes used for repetitive transmission of CE-PDCCH.

Method 3-2: $N_{ref\_rsc\_rep}$ (1812)=$N_{CE\text{-}PDCCH\_Rep}$ (1804), that is, according to method 3-2 of the second embodiment of the present disclosure, $N_{ref\_rsc\_rep}$ (1812) may be set as the number of subframes where PDSCH transmission is repeated for current downlink PDSCH coverage enhancement. Here, the terminal may be aware of $N_{ref\_rsc\_rep}$ set through RRC signaling according to the value indicated by the DCI.

Method 3-3: According to method 3-3 of the second embodiment of the present disclosure, $N_{ref\_rsc\_rep}$ (1812) may be set to the value indicated by the uplink scheduling DCI whose A-CSI request field is set to 1. In this case, the uplink scheduling DCI is transmitted, including a value indicating not an actual physical repetition count but a repetition level representable as a representative value for repetition count. Accordingly, according to an embodiment of the present disclosure, a new field for $N_{ref\_rsc\_rep}$ (1812) may be added to the uplink scheduling DCI format, or a value indicating $N_{ref\_rsc\_rep}$ (1812) may be included in one of the existing fields. For example, the transmit power control (TPC) field included in the uplink scheduling DCI format may be recycled to include the value indicating the four-step repetition level corresponding to $N_{ref\_rsc\_rep}$.

Method 3-4: According to method 3-4 of the second embodiment of the present disclosure, $N_{ref\_rsc\_rep}$ (1812) may be transferred from the base station through RRC signaling as a value set per terminal. Here, $N_{ref\_rsc\_rep}$ corresponding to coverage enhancement mode A or coverage enhancement mode B may be set, and a different $N_{ref\_rsc\_rep}$ value may be set depending on a coverage enhancement mode per terminal. For example, when the $N_{ref\_rsc\_rep}$ values are set corresponding to coverage enhancement mode A and coverage enhancement mode B, respectively, the terminal may identify the set coverage enhancement mode and select and use the $N_{ref\_rsc\_rep}$ value corresponding to the identified coverage enhancement mode. When other $N_{ref\_rsc\_rep}$ is set for the terminal depending on the coverage enhancement mode, if the coverage enhancement mode varies, the terminal may expect other $N_{ref\_rsc\_rep}$ to be set.

Method 3-5: According to method 3-5 of the second embodiment of the present disclosure, as $N_{ref\_rsc\_rep}$ (1812), a value commonly set to the terminals in the cell may be transferred through system information. Here, when the $N_{ref\_rsc\_rep}$ values respectively corresponding to coverage enhancement mode A and coverage enhancement mode B may be set, the terminal may select and use $N_{ref\_rsc\_rep}$ corresponding to the coverage enhancement mode set for the terminal.

According to the above embodiments, when methods 3-2, 3-3, 3-4, and 3-6 are used, if $N_{ref\_rsc\_rep}$ (1812)< $N_{CE\text{-}PDCCH\_Rep}$ (1815), the CSI reference resource transferred through $N_{ref\_rsc\_rep}$ (1812) consecutive subframes 1803 may be positioned to be sorted in the subframes constituting the CE-PDCCH (1805) by one of the following methods.

Method 4-1: According to method 4-1 of the second embodiment of the present disclosure, the CSI reference resource may be configured to be positioned in the start subframe of the subframes repeatedly transmitting CE-PDCCH 1805.

Method 4-2: According to method 4-2 of the second embodiment of the present disclosure, the CSI reference resource may be configured to be positioned in the end subframe of the subframes repeatedly transmitting CE-PDCCH.

When the above-described methods 3-2 and 3-3 are used, if $N_{ref\_rsc\_rep}$ (1812)>$N_{CE\text{-}PDCCH\_Rep}$ (1815), the CSI reference resource transmitted through $N_{ref\_rsc\_rep}$ (1812) consecutive subframes 1803 may be sorted in the repetition start subframe of CE-PDCCH (1805), and k 1806 may be set with more subframes whose number is larger than 4 so that CSI measurement may be complete through all of the $N_{ref\_rsc\_rep}$ (1812) subframes.

In the above embodiment, the terminal needing coverage enhancement measures CQI, PMI, or RI within the 1.4 MHz bandwidth where CE-PDCCH is transmitted in the subframes allocated as CSI reference resource. When CSI-RS is transmitted in the corresponding CSI reference resource, the terminal may measure CSI using CSI-RS, CRS, and demodulation-RS. Further, when no CSI-RS is transmitted in the corresponding CSI reference resource, the terminal may measure CSI using CRS and demodulation-RS.

According to an embodiment of the present disclosure, the terminal having measured CSI transmits a CSI report through the PUSCH 1810 for uplink (1811) data transmission after k (1806) subframes 1807. Here, the PUSCH 1810 including the CSI report may be transmitted through the subframe 1809 repeated $N_{PDCCH\_Rep}$ (1808) times. Here, K 1806 may be fixed to 4 considering CE-PDCCH reception processing time or CSI measurement time or may be transferred with a value commonly set for all the terminals through RRC signaling by the base station. As described above, when methods 3-2, 3-3, 3-4, and 3-5 are used, if $N_{ref\_rsc\_rep}$ (1812) >$N_{CE\text{-}PDCCH\_Rep}$ (1815), the CSI reference resource transferred through $N_{ref\_rsc\_rep}$ (1812) consecutive subframes 1803) may be sorted in the start subframe of repetitive subframes transmitting CE-PDCCH, and k 1806 may become larger than 4 so that CSI measurement may be complete through all of the $N_{ref\_rsc\_rep}$ (1802) subframes.

According to an embodiment of the present disclosure, the base station may use a common embodiment for all of the terminals in the cell or a fixed embodiment for each terminal in the case of the second embodiment using a plurality of subframes and in the case of using only one subframe as CSI reference resource according to the first embodiment.

Figure 19:
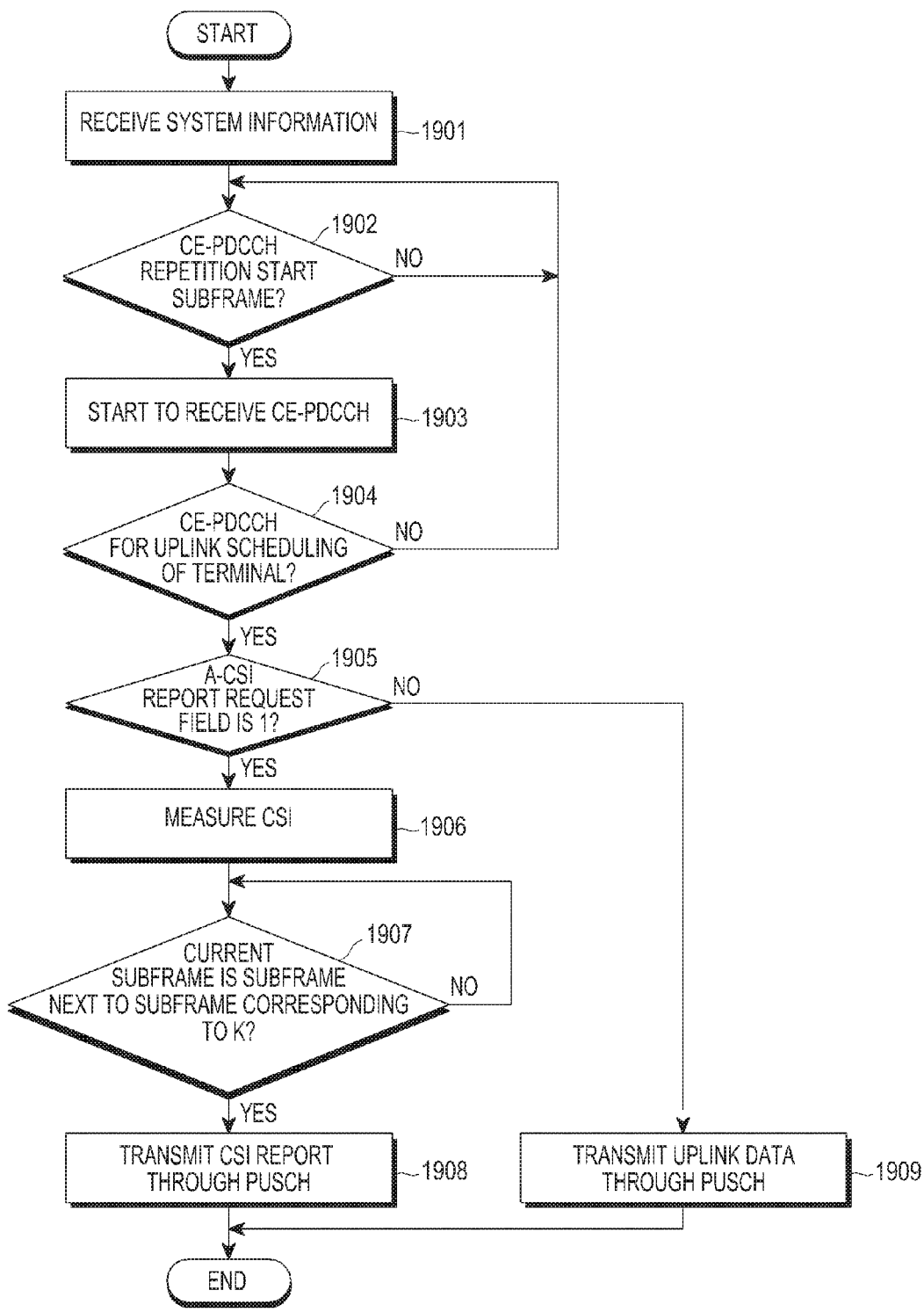
FIG. 19 is a flowchart illustrating an operation of a terminal when a low-cost terminal needing coverage enhancement receives a request for A-CSI report from a base station according to an embodiment of the present disclosure.

FIG. 19 is a flowchart illustrating an operation of a terminal when a low-cost terminal needing coverage enhancement receives a request for A-CSI report from a base station according to an embodiment of the present disclosure.

Referring to FIG. 19, according to an embodiment of the present disclosure, the terminal needing coverage enhancement receives system information from the base station in operation 1901, for example. The system information may include the number of repetitive transmissions required for each physical channel, information on the CE-PDCCH start subframe for receiving CE-PDCCH, and information related to the CSI reference resource configuration described in connection with the first embodiment and the second embodiment. In operation 1902, the low-cost terminal needing coverage enhancement determines whether the current subframe is the transmission start subframe of CE-PDCCH based on the system information received. When it is determined that the current subframe is the transmission start subframe of CE-PDCCH, it goes to operation 1903, and when the current subframe is not the transmission start subframe of CE-PDCCH, it waits until the current subframe becomes the transmission start subframe. In operation 1903, the terminal starts to receive CE-PDCCH. According to an embodiment of the present disclosure, the terminal receiving the CE-PDCCH may receive the CE-PDCCH using a CE-PDCCH repetition level for itself obtained through the system information. The terminal having completed the reception of CE-PDCCH goes to operation 1904 to determine whether the CE-PDCCH currently received is a CE-PDCCH for uplink scheduling of the terminal. When it is determined in operation 1904 that the currently received CE-PDCCH is CE-PDCCH for its uplink scheduling, it goes to operation 1905, and when the currently received CE-PDCCH is not the CE-PDCCH for its uplink scheduling, it goes to operation 1909. In operation 1905, the terminal determines whether the A-CSI report request field included in the DCI received through CE-PDCCH for uplink scheduling is set to 1. When it is determined that the A-CSI report request field is 1, the terminal measures CSI according to the first or second embodiment described above in operation 1906. Here, when the base station transmits CSI-RS, as the CSI reference resource of the terminal, through the subframe selected as in the first or second embodiment, the terminal may use CSI-RS and CRS in measuring the CSI. When the base station does not transmit CSI-RS as CSI reference resource of the terminal, CSI may be measured using common or cell specific reference signal (CRS). The terminal having completed the CSI measurement for CSI or CRS received through the subframe determined according to the first or second embodiment described above in operation 1906 determines whether k subframes from the last subframe allocated for repetitive transmission of CE-PDCCH have been received. That is, when it is determined that the current subframe is a subframe next to the k subframes in operation 1907, the terminal goes to operation 1908 to transmit a CSI report generated based on the CSI measurement through PUSCH to the base station. Here, when there is uplink data to be transmitted together, it may be transmitted along with the CSI report. When the A-CSI report request field is 0 in operation 1905, the terminal moves to operation 1909 to transmit uplink data through the PUSCH resource allocated by the base station.

Figure 20:
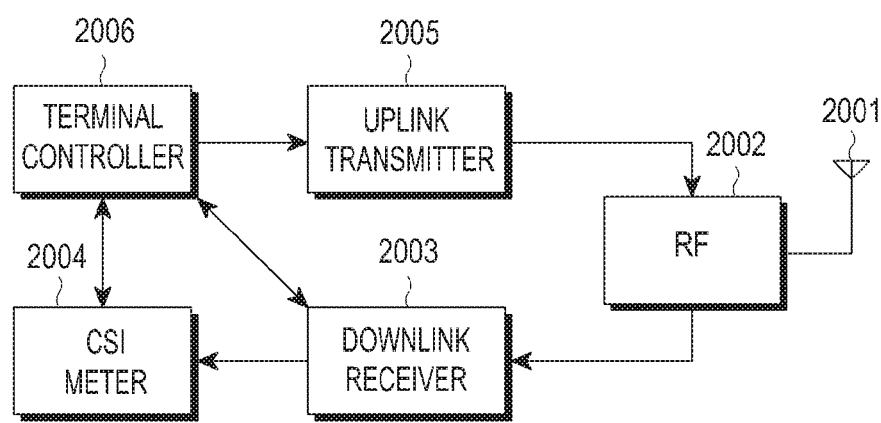
FIG. 20 is a block diagram illustrating an example of a low-cost terminal needing coverage enhancement according to an embodiment of the present disclosure.

FIG. 20 is a block diagram illustrating an example of a low-cost terminal needing coverage enhancement according to an embodiment of the present disclosure.

Referring to FIG. 20, the low-cost terminal needing coverage enhancement includes, e.g., an antenna 2001, an RF block 2002, a downlink receiver 2003, a CSI meter 2004, an uplink transmitter 2005, and a controller 2006. The configuration of the low-cost terminal is merely an example, and the configuration of the low-cost terminal may be split into subunits for separate detailed operations or some units may be combined into a single unit according to an embodiment of the present disclosure or depending on the business provider's intention.

According to an embodiment of the present disclosure, the low-cost terminal may perform RF processing on a signal received through the antenna 2001 by the RF block 2002 regardless of the system frequency band of the base station, convert the same to a 1.4 MHz band signal at a particular frequency position, and transfer the same to the downlink receiver 2003. The downlink receiver 2003 determines whether DCI has been received including the uplink scheduling information transmitted thereto through the CE-PDCCH transmitted from the base station. When the CSI reference resource field in the DCI included in the uplink scheduling information allocated thereto is set to 1, the terminal transfers the information to the terminal controller 2006 and the CSI meter 2004. The terminal controller 2006 instructs the CSI meter 2004 to perform CSI measurement. The CSI meter 2004 may measure CSI based on the signal obtained through the subframe corresponding to the CSI reference resource defined by the method according to the first and second embodiments and transfer to the terminal controller 2006. The terminal controller 2006 transfers the measured CSI value to the uplink transmitter 2005 and instructs to perform PUSCH transmission including a CSI request. The uplink transmitter 2005 may then generate a PUSCH signal, transfer to the RF unit 2002, and transfer to the base station through the antenna 2001.

Figure 21A:
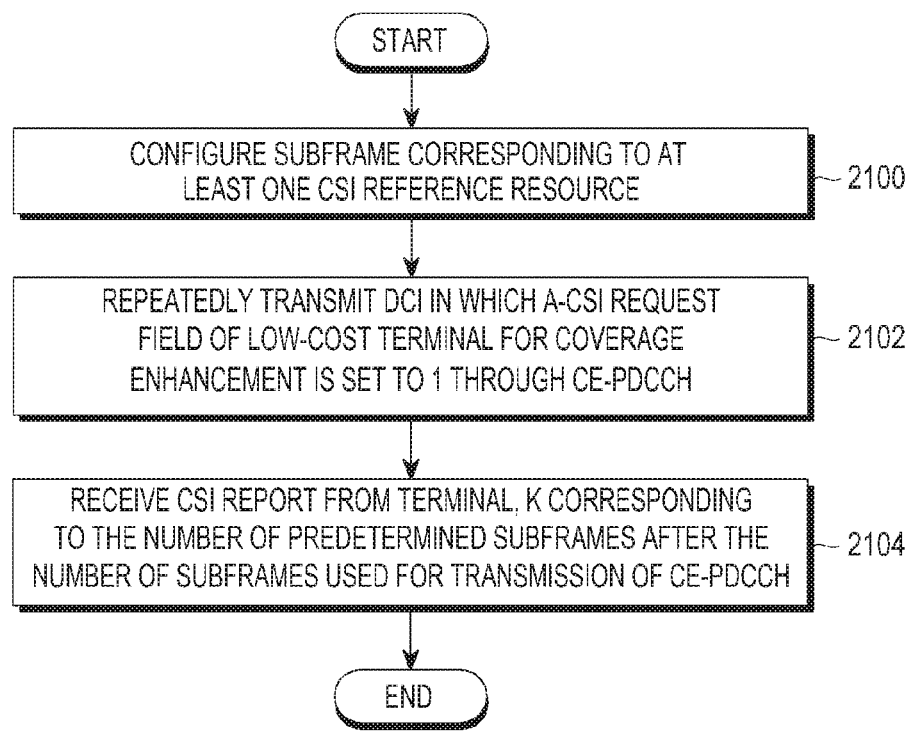
FIG. 21A is a flowchart illustrating an example of an operation of a base station according to an embodiment of the present disclosure.

FIG. 21A is a flowchart illustrating an example of an operation of a base station according to an embodiment of the present disclosure.

Referring to FIG. 21A, according to an embodiment of the present disclosure, the base station configures a subframe corresponding to at least one CSI reference resource for measuring aperiodic channel state information of the low-cost terminal for coverage enhancement in operation 2100. Here, as the sf, one or two or more subframes may be selected from among the subframes used for transmission of CE-PDCCH as described above. The information on the selected subframe may be previously set between terminal and base station or may be transferred from the base station to the terminal through system information or RRC signaling. A description thereof has been given above, and thus, is omitted here.

In operation 2102, the base station then repeatedly transmits the DCI where the A-CSI request field of the low-cost terminal needing coverage enhancement has been set to 1 through CE-PDCCH corresponding to the number of subframes used for transmission of the CE-PDCCH. In operation 2104, as shown in FIGS. 17 and 18, k corresponding to the number of preset subframes after the number of subframes used for transmission of the CE-PDCCH, the base station receives a CSI report from the terminal. The CSI report is measured based on the CSI or CRS received through the subframe corresponding to at least one CSI reference resource configured according to the above-described embodiment.

Figure 21B:
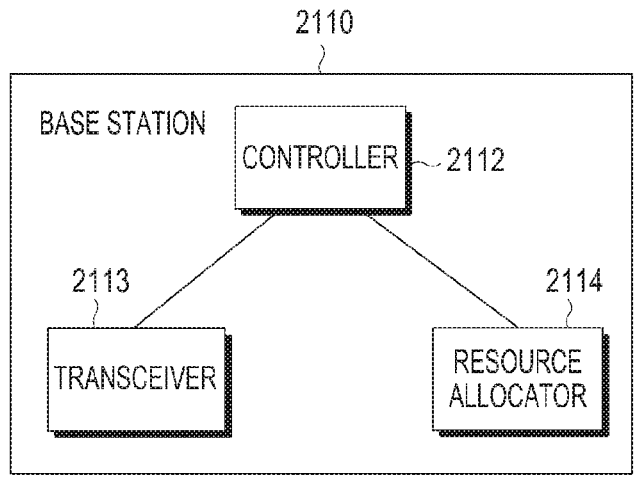
FIG. 21B is a block diagram illustrating a base station according to an embodiment of the present disclosure.

FIG. 21B is a block diagram illustrating a base station according to an embodiment of the present disclosure.

Referring to FIG. 21B, the base station 2110 includes, e.g., a transceiver 2113, a controller 2112, and a resource allocator 2114. The configuration of the base station 2110 is merely an example, and the configuration of the base station 2110 may be split into subunits for separate detailed operations or some units may be combined into a single unit according to an embodiment of the present disclosure or depending on the business provider's intention.

The transceiver 2113 performs an operation corresponding to operation 2102 or 2104 according to an instruction from the controller 2112. According to the above-described embodiments, it performs communication with the terminals.

The controller 2112 controls the overall operation of the base station 2110 according to the above-described embodiments of the present disclosure. The resource allocator 2114 allocates the subframe corresponding to at least one CSI reference resource for measuring aperiodic channel state information of the low-cost terminal, the number of subframes used for transmission of CE-PDCCH, and k corresponding to the number of preset subframes after the number of subframes used for transmission of the CE-PDCCH as in the embodiments of FIGS. 17 to 18 according to an instruction of the controller 2112. Definitions of the parameters have been given above, and thus, the further description thereof is not repeated.

As described above, an embodiment of the present disclosure may provide a CSI reference resource appropriate for a low-cost terminal needing coverage enhancement and provide a method and procedure for measuring A-CSI for low-cost terminal according to the same. Thus, the base station may assign a proper resource depending on the channel state of the terminal needing coverage enhancement, leading to enhanced downlink reception capability for the terminal. When the reception capability is enhanced by assigning resources depending on channel states, the number of repetitive transmission of downlink physical channels for coverage enhancement may be reduced, decreasing the power consumption of the terminal needing coverage enhancement.

Particular aspects of the present disclosure may be implemented in computer-readable codes on a computer-readable recording medium. The computer readable recording medium is a data storage device that may store data readable by a computer system. Examples of the computer readable recording medium may include read only memories (ROMs), random access memories (RAMs), compact disc ROMs (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner Functional programs, codes, and code segments to attain the present disclosure may be readily interpreted by skilled programmers in the art to which the present disclosure pertains.

The apparatuses and methods according to embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, CDs, digital versatile discs (DVDs), magnetic disks, magnetic tapes, or other optical or magnetic storage devices while retained in machine (e.g., computer)-readable storage media. The methods according to embodiments of the present disclosure may be implemented by a computer or a portable terminal including a controller and a memory, and the memory may be a machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting channel state information by a terminal in a communication system, the method comprising:
   receiving, from a base station, system information related to at least one reference subframe used for measuring aperiodic channel state information;
   receiving a control channel repeatedly transmitted corresponding to a predetermined number of subframes for the terminal using part of a bandwidth allocated by the base station;
   identifying, based on the system information, the at least one reference subframe among the subframes in which the control channel is received;
   when receiving a report request of the aperiodic channel state information through the control channel, measuring channel state information using a resource obtained through the at least one reference subframe; and
   transmitting the channel state information to a base station during an uplink transmission period,
   wherein the system information includes information on a number of repetitive transmissions for the control channel corresponding to the predetermined number of the subframes and information on a control channel start subframe for receiving the control channel, and
   wherein the at least one reference subframe is identified using the number of repetitive transmissions for the control channel.

2. The method of claim 1, wherein the uplink transmission period starts in a temporal section corresponding to predetermined subframes after the number of the subframes.

3. The method of claim 1,
   wherein the at least one reference subframe is configured differently per terminal or configured as a common subframe in a cell of the base station, and
   wherein the at least one reference subframe is set to a last subframe among subframes succeeding in reception among the subframes.

4. The method of claim 1, wherein the control channel starts transmission in any subframe among subframes configuring the allocated bandwidth.

5. A method for receiving channel state information by a base station in a communication system, the method comprising:
   configuring at least one reference subframe used for measuring aperiodic channel state information of a terminal using part of an allocated bandwidth;
   transmitting system information related to the at least one reference subframe to the terminal;
   transmitting control information including a request for the aperiodic channel state information through a control channel for the terminal repeatedly transmitted corresponding to a predetermined number of subframes; and
   receiving channel state information measured using a resource obtained through the at least one reference subframe from the terminal,
   wherein the at least one reference subframe is set among the subframes in which the control channel is transmitted,
   wherein the system information includes information on a number of repetitive transmissions for the control channel corresponding to the predetermined number of the subframes and information on a control channel start subframe for receiving the control channel, and
   wherein the at least one reference subframe is identified using the number of repetitive transmissions for the control channel.

6. The method of claim 5, wherein the channel state information is received through an uplink transmission period of the terminal started in a subframe next to a temporal section corresponding to predetermined subframes after the number of the subframes.

7. The method of claim 5,
   wherein the configuring of the at least one reference subframe includes configuring the at least one reference subframe differently per terminal or configuring as a common subframe in a cell of the base station, and
   wherein the configuring of the at least one reference subframe includes setting the at least one reference subframe to a last subframe among subframes succeeding in reception among the subframes.

8. The method of claim 5, wherein the control channel starts transmission in any subframe among subframes configuring the allocated bandwidth.

9. A terminal transmitting channel state information in a communication system, the terminal comprising:
   a receiver configured to:
      receive, from a base station, system information related to at least one reference subframe used for measuring aperiodic channel state information, and receive a control channel repeatedly transmitted corresponding to a predetermined number of subframes for the terminal using part of a bandwidth allocated by the base station;

at least one processor configured to:
   identify at least one reference subframe among the subframes in which the control channel is received based on system information, and
   when receiving a report request of the aperiodic channel state information through the control channel, measure channel state information using a resource obtained through the at least one reference subframe; and a transmitter configured to transmit the channel state information to a base station during an uplink transmission period, wherein the system information includes information on a number of repetitive transmissions for the control channel corresponding to the predetermined number of the subframes and information on a control channel start subframe for receiving the control channel, and wherein the at least one reference subframe is identified using the number of repetitive transmissions for the control channel.

10. The terminal of claim 9, wherein the uplink transmission period starts in a temporal section corresponding to predetermined subframes after the number of the subframes.

11. The terminal of claim 9,
wherein the at least one reference subframe is configured differently per terminal or configured as a common subframe in a cell of the base station, and
wherein the at least one reference subframe is set to a last subframe among subframes succeeding in reception among the subframes.

12. The terminal of claim 9, wherein the control channel starts transmission in any subframe among subframes configuring the allocated bandwidth.

13. A base station receiving channel state information in a communication system, the base station comprising:

at least one processor configured to:
   configure at least one reference subframe used for measuring aperiodic channel state information of a terminal using part of an allocated bandwidth, and
   transmit system information related to the at least one reference subframe to the terminal;

a transmitter configured to transmit control information including a request for the aperiodic channel state information through a control channel for the terminal repeatedly transmitted corresponding to a predetermined number of subframes; and a receiver configured to receive channel state information measured using a resource obtained through the at least one reference subframe from the terminal, wherein the at least one reference subframe is set among the subframes in which the control channel is transmitted, wherein the system information includes information on a number of repetitive transmissions for the control channel corresponding to the predetermined number of the subframes and information on a control channel start subframe for receiving the control channel, and wherein the at least one reference subframe is identified using the number of repetitive transmissions for the control channel.

14. The base station of claim 13, wherein the channel state information is received through an uplink transmission period of the terminal started in a subframe next to a temporal section corresponding to predetermined subframes after the number of the subframes.

15. The base station of claim 13,
wherein the at least one processor is further configured to configure the at least one reference subframe differently per terminal or as a common subframe in a cell of the base station, and
wherein the at least one processor is further configured to set the at least one reference subframe to a last subframe among subframes succeeding in reception among the subframes.

16. The base station of claim 13, wherein the control channel starts transmission in any subframe among subframes configuring the allocated bandwidth.

* * * * *